(12) United States Patent
Gast

(10) Patent No.: US 8,238,942 B2
(45) Date of Patent: Aug. 7, 2012

(54) WIRELESS STATION LOCATION DETECTION

(75) Inventor: Matthew Stuart Gast, San Francisco, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 873 days.

(21) Appl. No.: 11/944,346

(22) Filed: Nov. 21, 2007

(65) Prior Publication Data

US 2009/0131082 A1    May 21, 2009

(51) Int. Cl.
*H04W 24/00* (2009.01)

(52) U.S. Cl. ............... 455/457; 455/67.14; 455/522; 370/331; 370/324; 370/337; 370/519

(58) Field of Classification Search ............... 455/457, 455/67.14, 522; 370/324, 331, 37, 519
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRosa et al. |
| 4,247,908 A | 1/1981 | Lockart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |

(Continued)

FOREIGN PATENT DOCUMENTS

EP    0 992 921 A2    4/2000

(Continued)

OTHER PUBLICATIONS

Co-pending U.S. Appl. No. 10/235,338, filed Sep. 5, 2002.

(Continued)

*Primary Examiner* — Nimesh Patel

(57) ABSTRACT

A technique for locating a device uses connectivity to find a distance between an access point (AP) and a device. The AP transmits a frame to a device and receives an acknowledgement frame from the device. The amount of time for a signal to pass between the AP and the device is estimated and multiplied by the speed of light to find the distance between the AP and the device.

18 Claims, 13 Drawing Sheets

U.S. PATENT DOCUMENTS

| | | | |
|---|---|---|---|
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,955,053 A | 9/1990 | Siegmund |
| 4,995,053 A | 2/1991 | Simpson et al. |
| 5,008,899 A | 4/1991 | Yamamoto |
| 5,027,343 A | 6/1991 | Chan et al. |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,119,502 A | 6/1992 | Kallin et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,327,144 A | 7/1994 | Stilp et al. |
| 5,329,531 A | 7/1994 | Diepstraten |
| 5,339,316 A | 8/1994 | Diepstraten |
| 5,371,783 A | 12/1994 | Rose et al. |
| 5,418,812 A | 5/1995 | Reyes et al. |
| 5,444,851 A | 8/1995 | Woest |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,542,100 A | 7/1996 | Hatakeyama |
| 5,546,389 A | 8/1996 | Wippenbeck et al. |
| 5,561,841 A | 10/1996 | Markus |
| 5,568,513 A | 10/1996 | Croft et al. |
| 5,570,366 A | 10/1996 | Baker et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,677,954 A | 10/1997 | Hirata et al. |
| 5,706,428 A | 1/1998 | Boer et al. |
| 5,715,304 A | 2/1998 | Nishida et al. |
| 5,729,542 A | 3/1998 | Dupont |
| 5,742,592 A | 4/1998 | Scholefield et al. |
| 5,774,460 A | 6/1998 | Schiffel et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,653 A | 10/1998 | Goss |
| 5,828,960 A | 10/1998 | Tang et al. |
| 5,835,061 A | 11/1998 | Stewart |
| 5,838,907 A | 11/1998 | Hansen |
| 5,844,900 A | 12/1998 | Hong et al. |
| 5,852,722 A | 12/1998 | Hamilton |
| 5,872,968 A | 2/1999 | Knox et al. |
| 5,875,179 A | 2/1999 | Tikalsky |
| 5,887,259 A | 3/1999 | Zicker et al. |
| 5,896,561 A | 4/1999 | Schrader et al. |
| 5,909,686 A | 6/1999 | Muller et al. |
| 5,915,214 A | 6/1999 | Reece et al. |
| 5,920,821 A | 7/1999 | Seazholtz et al. |
| 5,933,607 A | 8/1999 | Tate et al. |
| 5,938,721 A | 8/1999 | Dussell et al. |
| 5,949,988 A | 9/1999 | Feisullin et al. |
| 5,953,669 A | 9/1999 | Stratis et al. |
| 5,960,335 A | 9/1999 | Umemoto et al. |
| 5,969,678 A | 10/1999 | Stewart |
| 5,970,066 A | 10/1999 | Lowry et al. |
| 5,977,913 A | 11/1999 | Christ |
| 5,980,078 A | 11/1999 | Krivoshein et al. |
| 5,982,779 A | 11/1999 | Krishnakumar et al. |
| 5,987,062 A | 11/1999 | Engwer et al. |
| 5,987,328 A | 11/1999 | Ephremides et al. |
| 5,991,817 A | 11/1999 | Rowett et al. |
| 5,999,813 A | 12/1999 | Lu et al. |
| 6,005,853 A | 12/1999 | Wang et al. |
| 6,011,784 A | 1/2000 | Brown |
| 6,012,088 A | 1/2000 | Li et al. |
| 6,029,196 A | 2/2000 | Lenz |
| 6,041,240 A | 3/2000 | McCarthy et al. |
| 6,041,358 A | 3/2000 | Huang et al. |
| 6,070,243 A | 5/2000 | See et al. |
| 6,073,075 A | 6/2000 | Kondou et al. |
| 6,073,152 A | 6/2000 | DeVries |
| 6,078,568 A | 6/2000 | Wright |
| 6,088,591 A | 7/2000 | Trompower |
| 6,101,539 A | 8/2000 | Kennelly et al. |
| 6,115,390 A | 9/2000 | Chuah |
| 6,118,771 A | 9/2000 | Tajika et al. |
| 6,119,009 A | 9/2000 | Baranger et al. |
| 6,122,520 A | 9/2000 | Want et al. |
| 6,144,638 A | 11/2000 | Obenhuber et al. |
| 6,148,199 A | 11/2000 | Hoffman et al. |
| 6,154,776 A | 11/2000 | Martin |
| 6,160,804 A | 12/2000 | Ahmed et al. |
| 6,177,905 B1 | 1/2001 | Welch |
| 6,188,649 B1 | 2/2001 | Fine et al. |
| 6,199,032 B1 | 3/2001 | Anderson |
| 6,208,629 B1 | 3/2001 | Jaszewki et al. |
| 6,208,841 B1 | 3/2001 | Wallace et al. |
| 6,212,395 B1 | 4/2001 | Lu et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,240,291 B1 | 5/2001 | Narasimhan et al. |
| 6,246,751 B1 | 6/2001 | Bergl et al. |
| 6,249,252 B1 | 6/2001 | Dupray |
| 6,256,300 B1 | 7/2001 | Ahmed et al. |
| 6,256,334 B1 | 7/2001 | Adachi |
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watannabe |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,574,240 B1 | 6/2003 | Tzeng |
| 6,580,700 B1 | 6/2003 | Pinard et al. |
| 6,587,680 B1 | 7/2003 | Ata-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |

| | | | | | | |
|---|---|---|---|---|---|---|
| 6,650,912 B2 | 11/2003 | Chen et al. | | 7,349,412 B1 | 3/2008 | Jones et al. |
| 6,658,389 B1 | 12/2003 | Alpdemir | | 7,350,077 B2 | 3/2008 | Meier et al. |
| 6,659,947 B1 | 12/2003 | Carter et al. | | 7,359,676 B2 | 4/2008 | Hrastar |
| 6,674,403 B2 | 1/2004 | Gray et al. | | 7,370,362 B2 | 5/2008 | Olson et al. |
| 6,677,894 B2 | 1/2004 | Sheynblat et al. | | 7,376,080 B1 | 5/2008 | Riddle et al. |
| 6,678,516 B2 | 1/2004 | Nordman et al. | | 7,379,423 B1 | 5/2008 | Caves et al. |
| 6,678,802 B2 | 1/2004 | Hickson | | 7,382,756 B2 | 6/2008 | Barber et al. |
| 6,687,498 B2 | 2/2004 | McKenna et al. | | 7,417,953 B2 | 8/2008 | Hicks et al. |
| 6,697,415 B1 | 2/2004 | Mahany | | 7,421,248 B1 | 9/2008 | Laux et al. |
| 6,721,334 B1 | 4/2004 | Ketcham | | 7,421,487 B1 | 9/2008 | Peterson et al. |
| 6,725,260 B1 | 4/2004 | Philyaw | | 7,440,416 B2 | 10/2008 | Mahany et al. |
| 6,738,629 B1 * | 5/2004 | McCormick et al. ...... 455/456.1 | | 7,443,823 B2 | 10/2008 | Hunkeler et al. |
| 6,747,961 B1 | 6/2004 | Ahmed et al. | | 7,460,855 B2 | 12/2008 | Barkley et al. |
| 6,756,940 B2 | 6/2004 | Oh et al. | | 7,466,678 B2 | 12/2008 | Cromer et al. |
| 6,760,324 B1 | 7/2004 | Scott et al. | | 7,475,130 B2 | 1/2009 | Silverman |
| 6,785,275 B1 | 8/2004 | Boivie et al. | | 7,477,894 B1 | 1/2009 | Sinha |
| 6,798,788 B1 | 9/2004 | Viswanath et al. | | 7,480,264 B1 * | 1/2009 | Duo et al. .................. 370/310.2 |
| 6,801,782 B2 | 10/2004 | McCrady et al. | | 7,483,390 B2 | 1/2009 | Rover et al. |
| 6,826,399 B1 | 11/2004 | Hoffman et al. | | 7,489,648 B2 | 2/2009 | Griswold |
| 6,839,338 B1 | 1/2005 | Amara et al. | | 7,493,407 B2 | 2/2009 | Leedom et al. |
| 6,839,348 B2 | 1/2005 | Tang et al. | | 7,505,434 B1 | 3/2009 | Backes |
| 6,839,388 B2 | 1/2005 | Vaidyanathan | | 7,509,096 B2 | 3/2009 | Palm et al. |
| 6,847,620 B1 | 1/2005 | Meier | | 7,529,925 B2 | 5/2009 | Harkins |
| 6,847,892 B2 | 1/2005 | Zhou et al. | | 7,551,574 B1 | 6/2009 | Peden, II et al. |
| 6,856,800 B1 | 2/2005 | Henry et al. | | 7,551,619 B2 | 6/2009 | Tiwari |
| 6,879,812 B2 | 4/2005 | Agrawal et al. | | 7,558,266 B2 | 7/2009 | Hu |
| 6,901,439 B1 | 5/2005 | Bonasia et al. | | 7,570,656 B2 | 8/2009 | Raphaeli et al. |
| 6,917,688 B2 | 7/2005 | Yu et al. | | 7,573,859 B2 | 8/2009 | Taylor |
| 6,934,260 B1 | 8/2005 | Kanuri | | 7,577,453 B2 | 8/2009 | Matta |
| 6,937,566 B1 | 8/2005 | Forslow | | 7,592,906 B1 | 9/2009 | Hanna et al. |
| 6,938,079 B1 | 8/2005 | Anderson et al. | | 7,603,119 B1 | 10/2009 | Durig et al. |
| 6,957,067 B1 | 10/2005 | Iyer et al. | | 7,636,363 B2 | 12/2009 | Chang et al. |
| 6,973,622 B1 | 12/2005 | Rappaport et al. | | 7,680,501 B2 * | 3/2010 | Sillasto et al. ............. 455/456.1 |
| 6,978,301 B2 | 12/2005 | Tindal | | 7,693,526 B2 | 4/2010 | Qian et al. |
| 6,980,533 B1 | 12/2005 | Abraham et al. | | 7,715,432 B2 | 5/2010 | Bennett |
| 6,985,469 B2 | 1/2006 | Leung | | 7,716,379 B2 | 5/2010 | Ruan et al. |
| 6,993,683 B1 | 1/2006 | Bhat et al. | | 7,724,703 B2 | 5/2010 | Matta et al. |
| 6,996,630 B1 | 2/2006 | Masaki et al. | | 7,724,704 B2 | 5/2010 | Simons et al. |
| 7,013,157 B1 | 3/2006 | Norman et al. | | 7,729,278 B2 | 6/2010 | Chari et al. |
| 7,020,438 B2 | 3/2006 | Sinivaara et al. | | 7,733,868 B2 | 6/2010 | Van Zijst |
| 7,020,773 B1 | 3/2006 | Otway et al. | | 7,746,897 B2 | 6/2010 | Stephenson et al. |
| 7,024,199 B1 | 4/2006 | Massie et al. | | 7,788,475 B2 | 8/2010 | Zimmer et al. |
| 7,024,394 B1 | 4/2006 | Ashour et al. | | 7,805,529 B2 | 9/2010 | Galluzzo et al. |
| 7,027,773 B1 | 4/2006 | McMillin | | 7,817,554 B2 | 10/2010 | Skog et al. |
| 7,031,705 B2 * | 4/2006 | Grootwassink ............ 455/432.1 | | 7,844,298 B2 | 11/2010 | Riley |
| 7,035,220 B1 | 4/2006 | Simcoe | | 7,865,713 B2 | 1/2011 | Chesnutt et al. |
| 7,039,037 B2 | 5/2006 | Wang et al. | | 7,873,061 B2 | 1/2011 | Gast et al. |
| 7,058,414 B1 * | 6/2006 | Rofheart et al. ........... 455/456.4 | | 7,912,982 B2 | 3/2011 | Murphy |
| 7,062,566 B2 | 6/2006 | Amara et al. | | 7,920,548 B2 | 4/2011 | Lor et al. |
| 7,068,999 B2 | 6/2006 | Ballai | | 7,929,922 B2 | 4/2011 | Kubo |
| 7,079,537 B1 | 7/2006 | Kanuri et al. | | 7,945,399 B2 | 5/2011 | Nosovitsky et al. |
| 7,089,322 B1 | 8/2006 | Stallmann | | 8,019,082 B1 | 9/2011 | Wiedmann et al. |
| 7,092,529 B2 | 8/2006 | Yu et al. | | 2001/0024953 A1 | 9/2001 | Balogh |
| 7,110,756 B2 | 9/2006 | Diener | | 2002/0021701 A1 | 2/2002 | Lavian et al. |
| 7,116,979 B2 | 10/2006 | Backes et al. | | 2002/0052205 A1 | 5/2002 | Belostofsky et al. |
| 7,126,913 B1 | 10/2006 | Patel et al. | | 2002/0060995 A1 | 5/2002 | Cervello et al. |
| 7,134,012 B2 | 11/2006 | Doyle et al. | | 2002/0062384 A1 | 5/2002 | Tso |
| 7,139,829 B2 | 11/2006 | Wenzel et al. | | 2002/0069278 A1 | 6/2002 | Forslow |
| 7,142,867 B1 | 11/2006 | Gandhi et al. | | 2002/0078361 A1 | 6/2002 | Giroux et al. |
| 7,146,166 B2 | 12/2006 | Backes et al. | | 2002/0080790 A1 | 6/2002 | Beshai |
| 7,155,236 B2 | 12/2006 | Chen et al. | | 2002/0087699 A1 | 7/2002 | Karagiannis et al. |
| 7,155,518 B2 | 12/2006 | Forslow | | 2002/0094824 A1 | 7/2002 | Kennedy et al. |
| 7,158,777 B2 | 1/2007 | Lee et al. | | 2002/0095486 A1 * | 7/2002 | Bahl ........................... 709/223 |
| 7,159,016 B2 | 1/2007 | Baker | | 2002/0101868 A1 | 8/2002 | Clear et al. |
| 7,221,927 B2 | 5/2007 | Kolar et al. | | 2002/0116655 A1 | 8/2002 | Lew et al. |
| 7,224,970 B2 | 5/2007 | Smith et al. | | 2002/0157020 A1 | 10/2002 | Royer |
| 7,239,862 B1 | 7/2007 | Clare et al. | | 2002/0174137 A1 | 11/2002 | Wolff et al. |
| 7,246,243 B2 | 7/2007 | Uchida | | 2002/0176437 A1 | 11/2002 | Busch et al. |
| 7,263,366 B2 | 8/2007 | Miyashita | | 2002/0188756 A1 | 12/2002 | Weil et al. |
| 7,274,730 B2 | 9/2007 | Nakabayashi | | 2002/0191572 A1 | 12/2002 | Weinstein et al. |
| 7,280,495 B1 | 10/2007 | Zweig et al. | | 2002/0194251 A1 | 12/2002 | Richter et al. |
| 7,290,051 B2 | 10/2007 | Dobric et al. | | 2003/0014646 A1 | 1/2003 | Buddhikot et al. |
| 7,293,136 B1 | 11/2007 | More et al. | | 2003/0018889 A1 | 1/2003 | Burnett et al. |
| 7,310,664 B1 | 12/2007 | Merchant et al. | | 2003/0043073 A1 | 3/2003 | Gray et al. |
| 7,317,914 B2 | 1/2008 | Adya et al. | | 2003/0055959 A1 | 3/2003 | Sato |
| 7,320,070 B2 | 1/2008 | Baum | | 2003/0107590 A1 | 6/2003 | Levillain et al. |
| 7,324,468 B2 | 1/2008 | Fischer | | 2003/0120764 A1 | 6/2003 | Laye et al. |
| 7,324,487 B2 | 1/2008 | Saito | | 2003/0133450 A1 | 7/2003 | Baum |
| 7,324,489 B1 | 1/2008 | Iyer et al. | | 2003/0134642 A1 | 7/2003 | Kostic et al. |

| | | | | | | |
|---|---|---|---|---|---|---|
| 2003/0135762 A1 | 7/2003 | Macaulay | | 2005/0175027 A1 | 8/2005 | Miller et al. |
| 2003/0156586 A1 | 8/2003 | Lee et al. | | 2005/0180345 A1 | 8/2005 | Meier |
| 2003/0174706 A1 | 9/2003 | Shankar et al. | | 2005/0180358 A1 | 8/2005 | Kolar et al. |
| 2003/0193910 A1 | 10/2003 | Shoaib et al. | | 2005/0181805 A1 | 8/2005 | Gallagher |
| 2003/0204596 A1 | 10/2003 | Yadav | | 2005/0190714 A1 | 9/2005 | Gorbatov et al. |
| 2003/0227934 A1 | 12/2003 | White et al. | | 2005/0193103 A1 | 9/2005 | Drabik |
| 2004/0002343 A1 | 1/2004 | Brauel et al. | | 2005/0207336 A1 | 9/2005 | Choi et al. |
| 2004/0003285 A1 | 1/2004 | Whelan et al. | | 2005/0213519 A1 | 9/2005 | Relan et al. |
| 2004/0019857 A1 | 1/2004 | Teig et al. | | 2005/0220033 A1 | 10/2005 | DelRegno et al. |
| 2004/0025044 A1 | 2/2004 | Day | | 2005/0223111 A1 | 10/2005 | Bhandaru et al. |
| 2004/0029580 A1 | 2/2004 | Haverinen et al. | | 2005/0239461 A1 | 10/2005 | Verma et al. |
| 2004/0030777 A1 | 2/2004 | Reedy et al. | | 2005/0240665 A1 | 10/2005 | Gu et al. |
| 2004/0038687 A1 | 2/2004 | Nelson | | 2005/0243737 A1 | 11/2005 | Dooley et al. |
| 2004/0044749 A1 | 3/2004 | Harkin | | 2005/0245258 A1 | 11/2005 | Classon et al. |
| 2004/0047320 A1 | 3/2004 | Eglin | | 2005/0245269 A1 | 11/2005 | Demirhan et al. |
| 2004/0053632 A1 | 3/2004 | Nikkelen et al. | | 2005/0259597 A1 | 11/2005 | Benedetto et al. |
| 2004/0054569 A1 | 3/2004 | Pombo et al. | | 2005/0259611 A1 | 11/2005 | Bhagwat et al. |
| 2004/0054774 A1 | 3/2004 | Barber et al. | | 2005/0270992 A1 | 12/2005 | Sanzgiri et al. |
| 2004/0054926 A1 | 3/2004 | Ocepek et al. | | 2005/0273442 A1 | 12/2005 | Bennett |
| 2004/0062267 A1 | 4/2004 | Minami et al. | | 2005/0276218 A1 | 12/2005 | Ooghe et al. |
| 2004/0064560 A1 | 4/2004 | Zhang et al. | | 2005/0286466 A1 | 12/2005 | Tagg et al. |
| 2004/0068668 A1 | 4/2004 | Lor et al. | | 2006/0030290 A1 | 2/2006 | Rudolf et al. |
| 2004/0078598 A1 | 4/2004 | Barber et al. | | 2006/0035662 A1 | 2/2006 | Jeong et al. |
| 2004/0093506 A1 | 5/2004 | Grawrock et al. | | 2006/0039395 A1 | 2/2006 | Perez-Costa et al. |
| 2004/0095914 A1 | 5/2004 | Katsube et al. | | 2006/0041683 A1 | 2/2006 | Subramanian et al. |
| 2004/0095932 A1 | 5/2004 | Astarabadi et al. | | 2006/0045050 A1 | 3/2006 | Floros et al. |
| 2004/0106403 A1 | 6/2004 | Mori et al. | | 2006/0046744 A1 | 3/2006 | Dublish et al. |
| 2004/0111640 A1 | 6/2004 | Baum | | 2006/0050742 A1 | 3/2006 | Grandhi et al. |
| 2004/0114546 A1 | 6/2004 | Seshadri et al. | | 2006/0073847 A1 | 4/2006 | Pirzada et al. |
| 2004/0119641 A1* | 6/2004 | Rapeli ........................... 342/450 | | 2006/0094440 A1 | 5/2006 | Meier et al. |
| 2004/0120370 A1 | 6/2004 | Lupo | | 2006/0098607 A1 | 5/2006 | Zeng et al. |
| 2004/0143428 A1 | 7/2004 | Rappaport et al. | | 2006/0104224 A1 | 5/2006 | Singh et al. |
| 2004/0143755 A1 | 7/2004 | Whitaker et al. | | 2006/0114872 A1 | 6/2006 | Hamada |
| 2004/0165545 A1 | 8/2004 | Cook | | 2006/0117174 A1 | 6/2006 | Lee |
| 2004/0174900 A1 | 9/2004 | Volpi et al. | | 2006/0128415 A1 | 6/2006 | Horikoshi et al. |
| 2004/0184475 A1 | 9/2004 | Meier | | 2006/0143496 A1 | 6/2006 | Silverman |
| 2004/0208570 A1 | 10/2004 | Reader | | 2006/0152344 A1 | 7/2006 | Mowery |
| 2004/0214572 A1 | 10/2004 | Thompson et al. | | 2006/0160540 A1* | 7/2006 | Strutt et al. ................... 455/440 |
| 2004/0221042 A1 | 11/2004 | Meier | | 2006/0161983 A1 | 7/2006 | Cothrell et al. |
| 2004/0230370 A1 | 11/2004 | Tzamaloukas | | 2006/0165103 A1 | 7/2006 | Trudeau et al. |
| 2004/0233234 A1 | 11/2004 | Chaudhry et al. | | 2006/0168383 A1 | 7/2006 | Lin |
| 2004/0236702 A1 | 11/2004 | Fink et al. | | 2006/0173844 A1 | 8/2006 | Zhang et al. |
| 2004/0246937 A1 | 12/2004 | Duong et al. | | 2006/0174336 A1 | 8/2006 | Chen |
| 2004/0246962 A1 | 12/2004 | Kopeikin et al. | | 2006/0178168 A1 | 8/2006 | Roach |
| 2004/0255167 A1 | 12/2004 | Knight | | 2006/0182118 A1 | 8/2006 | Lam et al. |
| 2004/0259542 A1 | 12/2004 | Viitamaki et al. | | 2006/0189311 A1 | 8/2006 | Cromer et al. |
| 2004/0259555 A1 | 12/2004 | Rappaport et al. | | 2006/0190721 A1 | 8/2006 | Kawakami et al. |
| 2004/0259575 A1 | 12/2004 | Perez-Breva et al. | | 2006/0193258 A1 | 8/2006 | Ballai |
| 2005/0015592 A1 | 1/2005 | Lin | | 2006/0200862 A1 | 9/2006 | Olson et al. |
| 2005/0021979 A1 | 1/2005 | Wiedmann et al. | | 2006/0206582 A1 | 9/2006 | Finn |
| 2005/0025105 A1 | 2/2005 | Rue | | 2006/0215601 A1 | 9/2006 | Vieugels et al. |
| 2005/0026611 A1 | 2/2005 | Backes | | 2006/0217131 A1 | 9/2006 | Alizadeh-Shabdiz et al. |
| 2005/0030894 A1 | 2/2005 | Stephens | | 2006/0245393 A1 | 11/2006 | Bajic |
| 2005/0030929 A1 | 2/2005 | Swier et al. | | 2006/0248229 A1 | 11/2006 | Saunderson et al. |
| 2005/0037818 A1 | 2/2005 | Seshadri et al. | | 2006/0248331 A1 | 11/2006 | Harkins |
| 2005/0040968 A1 | 2/2005 | Damarla et al. | | 2006/0268696 A1 | 11/2006 | Konstantinov et al. |
| 2005/0054326 A1 | 3/2005 | Rogers | | 2006/0274774 A1 | 12/2006 | Srinivasan et al. |
| 2005/0054350 A1 | 3/2005 | Zegelin | | 2006/0276192 A1 | 12/2006 | Dutta et al. |
| 2005/0058132 A1 | 3/2005 | Okano et al. | | 2006/0285489 A1 | 12/2006 | Francisco et al. |
| 2005/0059405 A1 | 3/2005 | Thomson et al. | | 2006/0292992 A1 | 12/2006 | Tajima et al. |
| 2005/0059406 A1 | 3/2005 | Thomson et al. | | 2007/0002833 A1 | 1/2007 | Bajic |
| 2005/0064873 A1 | 3/2005 | Karaoguz et al. | | 2007/0008884 A1 | 1/2007 | Tang |
| 2005/0068925 A1 | 3/2005 | Palm et al. | | 2007/0010248 A1 | 1/2007 | Dravida et al. |
| 2005/0073980 A1 | 4/2005 | Thomson et al. | | 2007/0011318 A1 | 1/2007 | Roth |
| 2005/0078644 A1 | 4/2005 | Tsai et al. | | 2007/0025265 A1 | 2/2007 | Porras et al. |
| 2005/0097618 A1 | 5/2005 | Arling et al. | | 2007/0025306 A1 | 2/2007 | Cox et al. |
| 2005/0114649 A1 | 5/2005 | Challener et al. | | 2007/0027964 A1 | 2/2007 | Herrod et al. |
| 2005/0120125 A1 | 6/2005 | Morten et al. | | 2007/0054616 A1 | 3/2007 | Culbert |
| 2005/0122927 A1* | 6/2005 | Wentink ........................ 370/311 | | 2007/0058598 A1 | 3/2007 | Ling |
| 2005/0122977 A1 | 6/2005 | Lieberman | | 2007/0064673 A1 | 3/2007 | Bhandaru et al. |
| 2005/0128142 A1 | 6/2005 | Shin et al. | | 2007/0064718 A1 | 3/2007 | Ekl et al. |
| 2005/0128989 A1 | 6/2005 | Bhagwat et al. | | 2007/0067823 A1 | 3/2007 | Shim et al. |
| 2005/0144237 A1 | 6/2005 | Heredia et al. | | 2007/0070937 A1 | 3/2007 | Demirhan et al. |
| 2005/0147032 A1 | 7/2005 | Lyon et al. | | 2007/0076694 A1 | 4/2007 | Iyer et al. |
| 2005/0154933 A1 | 7/2005 | Hsu et al. | | 2007/0081477 A1 | 4/2007 | Jakkahalli et al. |
| 2005/0157730 A1 | 7/2005 | Grant et al. | | 2007/0082677 A1 | 4/2007 | Hart et al. |
| 2005/0159154 A1 | 7/2005 | Goren | | 2007/0083924 A1 | 4/2007 | Lu |
| 2005/0163078 A1 | 7/2005 | Oba et al. | | 2007/0086378 A1 | 4/2007 | Matta et al. |
| 2005/0163146 A1 | 7/2005 | Ota et al. | | 2007/0086397 A1 | 4/2007 | Taylor |

| | | | |
|---|---|---|---|
| 2007/0086398 A1 | 4/2007 | Tiwari | |
| 2007/0091845 A1 | 4/2007 | Brideglall | |
| 2007/0091889 A1 | 4/2007 | Xiao et al. | |
| 2007/0098086 A1 | 5/2007 | Bhaskaran | |
| 2007/0106776 A1 | 5/2007 | Konno et al. | |
| 2007/0115842 A1* | 5/2007 | Matsuda et al. | 370/252 |
| 2007/0133494 A1 | 6/2007 | Lai et al. | |
| 2007/0135866 A1 | 6/2007 | Baker et al. | |
| 2007/0136372 A1 | 6/2007 | Proctor et al. | |
| 2007/0150945 A1 | 6/2007 | Whitaker et al. | |
| 2007/0160046 A1 | 7/2007 | Matta | |
| 2007/0171909 A1 | 7/2007 | Pignatelli | |
| 2007/0183375 A1 | 8/2007 | Tiwari | |
| 2007/0189222 A1 | 8/2007 | Kolar et al. | |
| 2007/0195793 A1 | 8/2007 | Grosser et al. | |
| 2007/0230457 A1 | 10/2007 | Kodera et al. | |
| 2007/0248009 A1 | 10/2007 | Petersen | |
| 2007/0253380 A1 | 11/2007 | Jollota et al. | |
| 2007/0255116 A1 | 11/2007 | Mehta et al. | |
| 2007/0258448 A1 | 11/2007 | Hu | |
| 2007/0260720 A1 | 11/2007 | Morain | |
| 2007/0268506 A1 | 11/2007 | Zeldin | |
| 2007/0268514 A1 | 11/2007 | Zeldin et al. | |
| 2007/0268515 A1 | 11/2007 | Freund et al. | |
| 2007/0268516 A1 | 11/2007 | Bugwadia et al. | |
| 2007/0286208 A1 | 12/2007 | Kanada et al. | |
| 2007/0287390 A1 | 12/2007 | Murphy et al. | |
| 2007/0291689 A1 | 12/2007 | Kapur et al. | |
| 2007/0297329 A1 | 12/2007 | Park et al. | |
| 2008/0002588 A1 | 1/2008 | McCaughan et al. | |
| 2008/0008117 A1 | 1/2008 | Alizadeh-Shabdiz | |
| 2008/0013481 A1 | 1/2008 | Simons et al. | |
| 2008/0014916 A1 | 1/2008 | Chen | |
| 2008/0031257 A1 | 2/2008 | He | |
| 2008/0056200 A1 | 3/2008 | Johnson | |
| 2008/0056211 A1 | 3/2008 | Kim et al. | |
| 2008/0064356 A1 | 3/2008 | Khayrallah | |
| 2008/0069018 A1 | 3/2008 | Gast | |
| 2008/0080441 A1* | 4/2008 | Park et al. | 370/338 |
| 2008/0102815 A1 | 5/2008 | Sengupta et al. | |
| 2008/0107077 A1 | 5/2008 | Murphy | |
| 2008/0114784 A1 | 5/2008 | Murphy | |
| 2008/0117822 A1 | 5/2008 | Murphy et al. | |
| 2008/0130523 A1 | 6/2008 | Fridman et al. | |
| 2008/0151844 A1 | 6/2008 | Tiwari | |
| 2008/0159319 A1 | 7/2008 | Gast et al. | |
| 2008/0162921 A1 | 7/2008 | Chesnutt et al. | |
| 2008/0226075 A1 | 9/2008 | Gast | |
| 2008/0228942 A1 | 9/2008 | Lor et al. | |
| 2008/0250496 A1 | 10/2008 | Namihira | |
| 2008/0261615 A1* | 10/2008 | Kalhan | 455/456.1 |
| 2008/0276303 A1 | 11/2008 | Gast | |
| 2009/0031044 A1 | 1/2009 | Barrack et al. | |
| 2009/0046688 A1 | 2/2009 | Volpi et al. | |
| 2009/0059930 A1 | 3/2009 | Ryan et al. | |
| 2009/0067436 A1 | 3/2009 | Gast | |
| 2009/0073905 A1 | 3/2009 | Gast | |
| 2009/0198999 A1 | 8/2009 | Harkins | |
| 2009/0247103 A1 | 10/2009 | Aragon | |
| 2009/0257437 A1 | 10/2009 | Tiwari | |
| 2009/0260083 A1 | 10/2009 | Szeto et al. | |
| 2009/0274060 A1 | 11/2009 | Taylor | |
| 2009/0287816 A1 | 11/2009 | Matta et al. | |
| 2009/0293106 A1 | 11/2009 | Peden, II et al. | |
| 2010/0002610 A1 | 1/2010 | Bowser et al. | |
| 2010/0024007 A1 | 1/2010 | Gast | |
| 2010/0040059 A1 | 2/2010 | Hu | |
| 2010/0067379 A1 | 3/2010 | Zhao et al. | |
| 2010/0172276 A1 | 7/2010 | Aragon | |
| 2010/0180016 A1 | 7/2010 | Bugwadia et al. | |
| 2010/0195549 A1 | 8/2010 | Aragon et al. | |
| 2010/0261475 A1 | 10/2010 | Kim et al. | |
| 2010/0329177 A1 | 12/2010 | Murphy et al. | |
| 2011/0128858 A1 | 6/2011 | Matta et al. | |
| 2011/0158122 A1 | 6/2011 | Murphy et al. | |

FOREIGN PATENT DOCUMENTS

| | | |
|---|---|---|
| EP | 1 542 409 A | 6/2005 |
| GB | 2329801 | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO 94/03986 | 2/1994 |
| WO | WO 99/11003 | 3/1999 |
| WO | WO 00/06271 A1 | 2/2000 |
| WO | WO 00/18148 | 3/2000 |
| WO | WO-02089442 A1 | 11/2002 |
| WO | WO 03/085544 A1 | 10/2003 |
| WO | WO-2004013986 A1 | 2/2004 |
| WO | WO 2004/095192 A2 | 11/2004 |
| WO | WO 2004/095800 A1 | 11/2004 |

OTHER PUBLICATIONS

Notice of Allowance Mailed Jul. 29, 2003 in Co-pending U.S. Appl. No. 10/235,338, filed Sep. 5, 2002.
Non-Final Offce Action Mailed Jan. 8, 2003 in Co-pending U.S. Appl. No. 10/235,338, filed Sep. 5, 2002.
Notice of Allowance Mailed Mar. 23, 2009 in Co-pending U.S. Appl. No. 11/094,987, filed Mar. 31, 2005.
Non-Final Offce Action Mailed Oct. 21, 2008 in Co-pending U.S. Appl. No. 11/094,987, filed Mar. 31, 2005.
Final Offce Action Mailed May 23, 2008 in Co-pending U.S. Appl. No. 11/094,987, filed Mar. 31, 2005.
Non-Final Offce Action Mailed Dec. 27, 2007, 2009 in Co-pending U.S. Appl. No. 11/094,987, filed Mar. 31, 2005.
Co-pending U.S. Appl. No. 12/474,020, filed May 28, 2009.
Non-Final Offce Action Mailed Jun. 3, 2010 in Co-pending U.S. Appl. No. 12/474,020, filed May 28, 2009.
Co-pending U.S. Appl. No. 09/866,474, filed May 29, 2001.
Non-Final Office Action Mailed Jun. 10, 2005 in Co-pending U.S. Appl. No. 09/866,474, filed May 29, 2001.
International Search Report of PCT/US2002/028090, Aug. 13, 2003, 3 pages.
Bahl et al., "User Location and Tracking in an In-Building Radio Network", Microsoft Research, Feb. 1999.
U.S. Appl. No. 11/326,966, filed Jan. 2006, Taylor.
U.S. Appl. No. 11/330,877, filed Jan. 2006, Matta.
U.S. Appl. No. 11/331,789, filed Jan. 2006, Matta, et al.
U.S. Appl. No. 11/351,104, filed Feb. 2006, Tiwari.
U.S. Appl. No. 11/377,859, filed Mar. 2006, Harkins.
U.S. Appl. No. 11/400,165, filed Apr. 2006, Tiwari.
U.S. Appl. No. 11/445,750, filed May 2006, Matta.
U.S. Appl. No. 11/417,830, filed May 2006, Morain.
U.S. Appl. No. 11/417,993, filed May 2006, Jar et al.
U.S. Appl. No. 11/437,537, filed May 2006, Freund et al.
U.S. Appl. No. 11/437,538, filed May 2006, Zeldin.
U.S. Appl. No. 11/437,387, filed May 2006, Zeldin et al.
U.S. Appl. No. 11/437,582, filed May 2006, Bugwadia et al.
U.S. Appl. No. 11/451,704, filed Jun. 2006, Riley.
U.S. Appl. No. 11/487,722, filed Jul. 2006, Simons et al.
U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Matthew S.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).

Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30- Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13$^{th}$ Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, 1977, pp. 45-50.
Piazzi et al., "Achievable Accuracy of Site-Specific Path-Loss Predictions in Residential Environments", IEEE Transactions on Vehicular Technology, vol. 48, No. 3, May 1999.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
Puttini, R., Percher, J., Me, L., and de Sousa, R. 2004. A fully distributed IDS for MANET. In *Proceedings of the Ninth international Symposium on Computers and Communications 2004 vol. 2 (ISCC 04)*—vol. 02 (Jun. 28-Jul. 1, 2004). ISCC. IEEE Computer Society, Washington, DC, 331-338.
U.S. Appl. No. 12/474,020, filed May 28, 2009, Peden, II et al.
Radar: An In-Building RF-based User Location and Tracking System, P. Bahl et al., Microsoft Research, Mar. 2000.
Evaluation of RSSI-Based Human Tracking, J. Latvala et al, Proceedings for the 2000 European Signal Processing Conference, Sep. 2000.
User Location and Tracking in an In-Building Radio Network, P. Bahl et al., Microsoft Research, Feb. 1999.
A Software System for Locating Mobile Users: Design, Evaluation, and Lessons, P. Bahl et al., Microsoft Research, Apr. 2000.
Chen, et al., "Enabling Location-Based Services on Wireless LANs", 11.sup.th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A data fusion architecture for enhanced position estimation in wireless networks," IEEE Communications Letters , vol. 5(8), p. 343-345, Aug. 2001.
Ultra wideband (UWB) Radios for Precision Location, Third IEEE Workshop on Wireless Local Area Networks, Sep. 27-28, 2001.
Barber, S., Monitoring 802.1 Networks, IEEE 802.11, Sydney, NSW, May 13-17, 2002.
Bahl, P. and V. Padmanabhan, Radar; An In-Building RF-based User Location and Tracking System, Microsoft Research, Mar. 2000.
Latvala, J., J. Syrjarinne, S. Niemi and J. Niittylahti, Patient Tracking in a Hospital Environment Using Extended Kalman-filtering, Proceedings of the 1999 Middle East Conference on Networking, Nov. 1999.
Myllymaki, P., T. Roos, H. Tirri, P. Misikangas and J. Sievanen, A Probabilistic Approach to WLAN User Location Estimation, Third IEEE Workshop on Wireless Local Area Networks, Sep. 27-28, 2001.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System; Wireless LAN Switch and Controller Configuration Guide, 3COM, Revision A, Oct. 2004, 476 pages.
3COM, Wireless LAN Switch Manager (3WXM), 3COM Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR the Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
U.S. Appl. No. 12/603,391, filed Oct. 21, 2009.
U.S. Appl. No. 12/763,057, filed Apr. 19, 2010.
U.S. Appl. No. 13/006,950, filed Jan. 14, 2011.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.

Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/437,537, mailed Dec. 23, 2008.
Final Office Action for U.S. Appl. No. 11/437,537, mailed Jul. 16, 2009.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.
Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/437,387, mailed Dec. 23, 2008.
Final Office Action for U.S. Appl. No. 11/437,387, mailed Jul. 15, 2009.
Office Action for U.S. Appl. No. 11/437,582, mailed Jan. 8, 2009.
Final Office Action for U.S. Appl. No. 11/437,582, mailed Jul. 22, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 12/077,051, mailed Dec. 28, 2010.
Office Action for U.S. Appl. No. 12/113,535, mailed Apr. 21, 2011.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/350,927, mailed Aug. 17, 2011.
Office Action for U.S. Appl. No. 12/365,891, mailed Aug. 29, 2011.
Final Office Action for U.S. Appl. No. 12/474,020, mailed Oct. 4, 2010.
Office Action for U.S. Appl. No. 09/866,474, mailed Nov. 30, 2004.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US2007/012194 dated Feb. 4, 2008.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US2007/12016, mailed Jan. 4, 2008.
International Search Report and Written Opinion for PCT/US2007/012195, mailed Mar. 19, 2008.
International Search Report and Written Opinion for PCT/US07/013758 mailed Apr. 3, 2008.
First Office Action for Chinese Application No. 2007800229623.X, mailed Dec. 31, 2010.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/US04/30769, mailed Oct. 4, 2005.
International Search Report and Written Opinion for PCT/US04/30683, mailed Feb. 10, 2006.
International Search Report and Written Opinion for PCT/US04/30684, mailed Feb. 10, 2006.
Final Office Action for U.S. Appl. No. 12/489,295, mailed Jan. 18, 2012.
Office Action for U.S. Appl. No. 11/351,104, mailed Feb. 15, 2012.
Office Action for U.S. Appl. No. 12/370,562, mailed Jan. 17, 2012.
Office Action for U.S. Appl. No. 12/683,281, mailed Jan. 20, 2012.

Final Office Action for U.S. Appl. No. 12/304,100, mailed Feb. 2, 2012.
Final Office Action for U.S. Appl. No. 11/852,234, mailed Jan. 20, 2012.
Final Office Action for U.S. Appl. No. 12/350,927, mailed Jan. 18, 2012.

* cited by examiner

WIRELESS STATION LOCATION DETECTION

BACKGROUND

Devices on a network may be considered client devices or rogue devices. Generally, clients have permission to use the network, and rogues do not. For rogues, elimination is desirable. It may be possible that an operator of the rogue device may attempt to frustrate efforts to find the rogue. A rogue device at an unknown location may be difficult to eliminate, requiring the use of strong countermeasures, e.g. suppression of service.

An existing approach uses a received signal strength indicator (RSSI) to locate devices. RSSI levels may be used to estimate a device distance. High RSSI is indicative of closer proximity than low RSSI. The RSSI approach may yield poor results because client transmit power is usually unknown. Further, a precise model of a radio environment is generally unavailable.

Another existing approach uses time differences of arrival (TDOA). TDOA removes signal attenuation from the calculation. However, TDOA is similarly flawed in that nanosecond clocks are generally not synchronized and synchronizing them is difficult. Further, in TDOA, paths to the location avoids obstacles in different ways. Varying path lengths from varying points may cause TDOA to suffer in quality when higher numbers of different points are used to find a location. This is counter intuitive because a greater number of measurements would seem to lead to a more accurate location.

The foregoing examples of the related art and limitations related therewith are intended to be illustrative and not exclusive. Other limitations of the related art will become apparent upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above-described problems have been reduced or eliminated, while other examples are directed to other improvements.

A technique for locating a device may involve transmitting a frame to a device and receiving an acknowledgement frame from the device. The amount of time for a signal to pass between the AP and the device may be estimated and multiplied by the speed of light to find the distance between the AP and the device. Many distances calculated from many APs may be used to determine a location of the device. Sometimes a single AP may be used to find possible locations of a device in two dimensions. In three dimensions, a number of APs may by used to locate a device, such in an outdoor network.

Advantageously, locating a device may ease a burden of responding to the device. For example, a located rogue may be eliminated without suppressing service. Advantageously, the rouge is eliminated while service remains unaffected.

Consider, for the purposes of example only, a rogue device operated by a rogue operator that does not have permission to use a network. The rogue device is well hidden in a building. In some cases a network administrator may employ countermeasures, shutting down service to portions of the network that the rogue would use. However, using the technique disclosed herein, the rogue is located, security is dispatched, and the rogue computing device is quickly eliminated without interrupting service. Users of the network may remain unaware that an intruding rogue was ever present.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
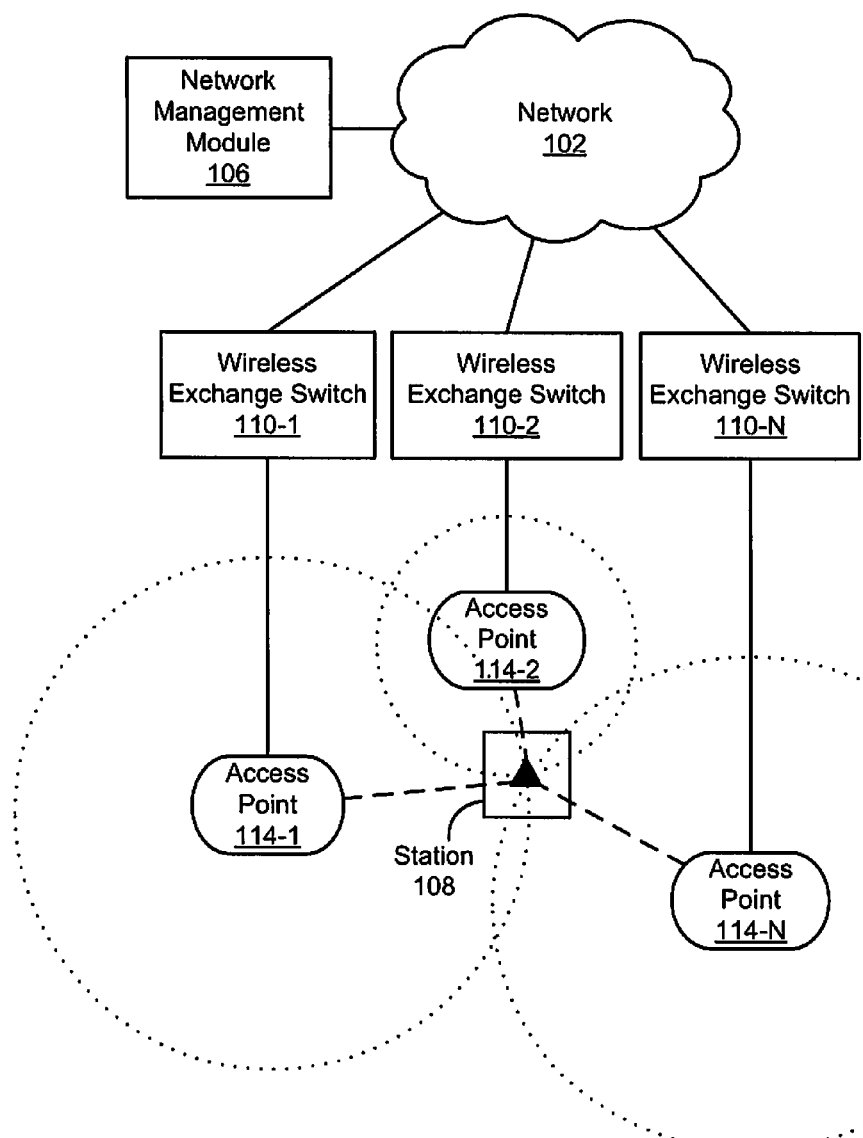
FIG. 1 depicts a diagram of an example of a system including a wireless access domain.

FIG. 1 depicts a diagram 100 of an example of a system including a wireless access domain. The system 100 includes network 102, network management module 106, station 108, wireless exchange switch 110-1, wireless exchange switch 110-2, wireless exchange switch 110-N (collectively wireless exchange switches 110), access point 114-1, access point 114-2, access point 114-N (collectively access points 114).

In the example of FIG. 1, the network 102 may be practically any type of communications network. By way of example but not limitation, the wireless access domain 104 may be referred to as, a Local Area Network (LAN), virtual LAN (VLAN), and/or wireless LAN (WLAN).

In the example of FIG. 1, the network management module 106 may be practically any type of component or device that is capable of communicating with a communications network, such as, by way of example but not limitation, a mainframe or a workstation as well as a module coupled to or operating in software on a server, AP, wireless exchange switches or other network component.

In the example of FIG. 1, the station 108 may be any computing device, by way of example but not limitation, a laptop, a wireless telephone, or any device capable of communication on a wireless network. A station, as used herein, may be referred to as a device with a media access control (MAC) address and a physical layer (PHY) interface to the wireless medium that comply with the IEEE 802.11 standard. As such, the access points 114 are typically also stations. In alternative examples, a station may comply with a different standard than IEEE 802.11, and may have different interfaces to a wireless or other medium. The station 108 may include a radio capable of generating signals compatible with communication on one or more networks. The station 108 may be in radio communication with one or more of the access points 114.

In the example of FIG. 1, wireless exchange switches 110 may swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown).

The wireless exchange switches 110 provide forwarding, queuing, tunneling, and/or some security services for the information the wireless exchange switches 110 receive from their associated access points 114. The wireless exchange switches 110 coordinate, may provide power to, and/or manage the configuration of the associated access points 114. An implementation of a wireless exchange switches, provided by way of example but not limitation, includes a Trapeze Networks Mobility Exchange® switch. The Trapeze Networks Mobility Exchange® switches may, in another implementation, be coordinated by means of the Trapeze Access Point Access™ (TAPA™) protocol.

In a non-limiting example, the access points 114 are hardware units that act as a communication hub by linking wireless mobile stations such as PCs to a wired backbone network. In an example the access points 114 connect users to other users within the network and, in another example, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System® Mobility Point® (MP®) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting example, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

Figure 2:
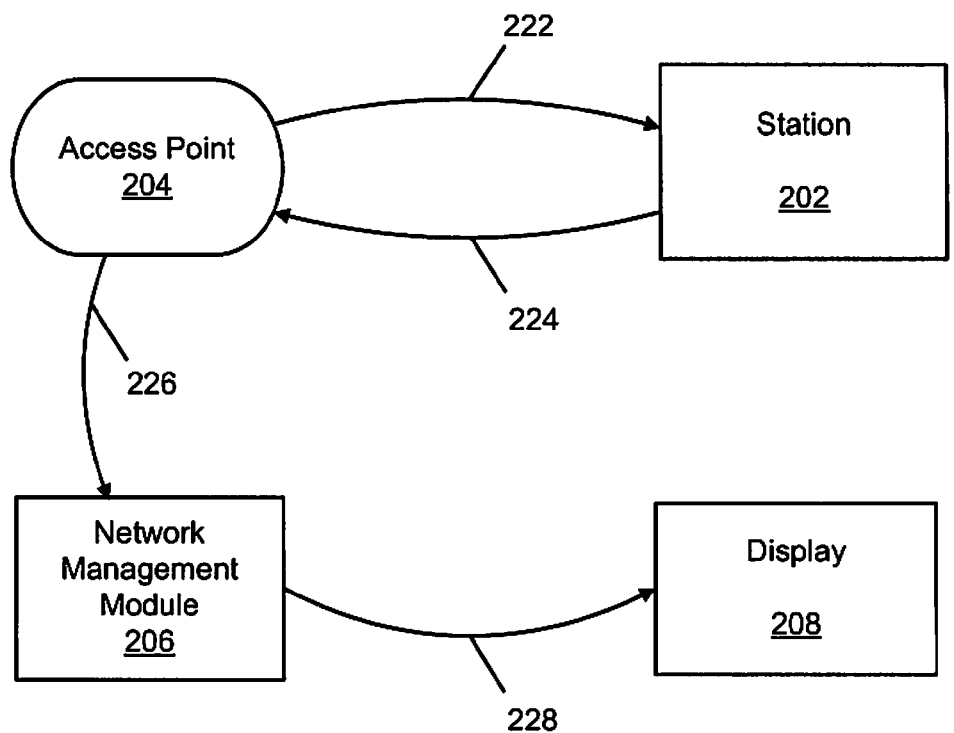
FIG. 2 depicts a diagram of an example of a system transmitting a frame, receiving an acknowledgement frame, calculating a distance to a station, and displaying results.

FIG. 2 depicts a diagram 200 of an example of a system transmitting a frame, receiving an acknowledgement frame, calculating a distance to a station, and displaying results. In the example of FIG. 2, the diagram 200 includes station 202, access point 204, network management module 206, display 208, frame transmission indicator 222, acknowledgement frame transmission indicator 224, location data communication indicator 226, and display of contents indicator 228.

Station 202 may be a device capable of radio communication with one or more access points. In a non-limiting example, the station 202 may be configured for communication using IEEE 802.11 standard communication, but any known or convenient standard for communication may be used.

Access point 204 may be an access point as discussed in reference to FIG. 2, and may be capable of communication with one or more stations via IEEE 802.11 standard communications. Network management module 106 may be practically any type of component or device that is capable of communicating with a communications network, such as, by way of example but not limitation, a mainframe or a workstation as well as a module coupled to or operating in software on a server, AP, wireless exchange or other network component.

Network management module 206 may be practically any type of component or device that is capable of communicating with a communications network. A workstation as well as a module coupled to or operating in software on a server, AP, wireless exchange or other network component could be used. Access point 204 may be coupled to, or contain network management module 206. AP 204 and network management module 206 may further be modules in another component such as a wireless exchange switch.

Display 208 may provide a view of a layout of a building, floorplan, or other known or convenient manner of visualizing an environment including APs and stations. AP 204 may be displayed on display 208. Station 202 may be displayed on display 208. Display 208 may be connected to network management module 206 and display information provided by network management module 206.

In the example of FIG. 2, in operation, AP 204 transmits a frame to station 202. Frame transmission indicator 222 depicts the transmission of the frame from AP 204 to station 202. The frames may be null frames. Typically, null frames have headers, but not payload. AP 204 records a time of transmission of the frame.

Such frames may be referred to as "ping" frames. Because of variance in acknowledgement over time, a single ping frame may be insufficient to acquire an accurate estimate of a distance between an AP and a device. It may be advantageous to use multiple ping frames and average a round trip time for transmitting a ping frame and receiving an acknowledgement frame. Averaging many values may lead to a more accurate estimate of the distance between the AP and the device. Multiple pings may be coordinated to occur during ActiveScan intervals to avoid interruptions in service.

A rogue device may encrypt data in transmission, and refuse to respond to frames that do not have proper encryption keys. However, by using a null frame, a rogue device may respond regardless of encryption. A rogue device may refuse to transmit an Acknowledgement frame. A system may respond by denying the rogue device use of system resources, and if necessary, completely suspending service to a portion of the network, or the entire network. This response may be automatic, or may be manually initiated by an administrator.

It may be necessary to "spoof" or supply an inaccurate 802.11 frame control field sequence number to be accepted by a device, however, many 802.11i implementations do not validate an 802.11 frame sequence number. A device may check the TKIP (Temporal Key Integrity Protocol), or CCMP Packet No. (Counter Mode with Cyper Block Chaining Message Authentication Code Protocol) instead. A rogue device may accept the transmitted ping frame, and respond with an acknowledgement frame.

In the example of FIG. 2, acknowledgement frame transmission indicator 224 depicts station 202 transmitting an acknowledgement frame. AP 204 receives the acknowledgement frame, and records a time of receipt of the acknowledgement frame.

In the example of FIG. 2, AP 204 provides location data to network management module 206. Location data communication indicator 226 shows AP 204 communicating time of transmission of the frame and time of receipt of the acknowledgement frame to network management module 206. Network management module 206 calculates a distance d between AP 204 and station 202.

In the example of FIG. 2, display of contents indicator 228 depicts network management module 206 providing location information to display 208. The location information may be based on the distance d between the AP and the station to display 208 as indicated by display of contents indicator 228. Location information may be in the form of an identification of the location of the station, multiple possible locations for the station, or other information about the location of station 202.

Figure 3:
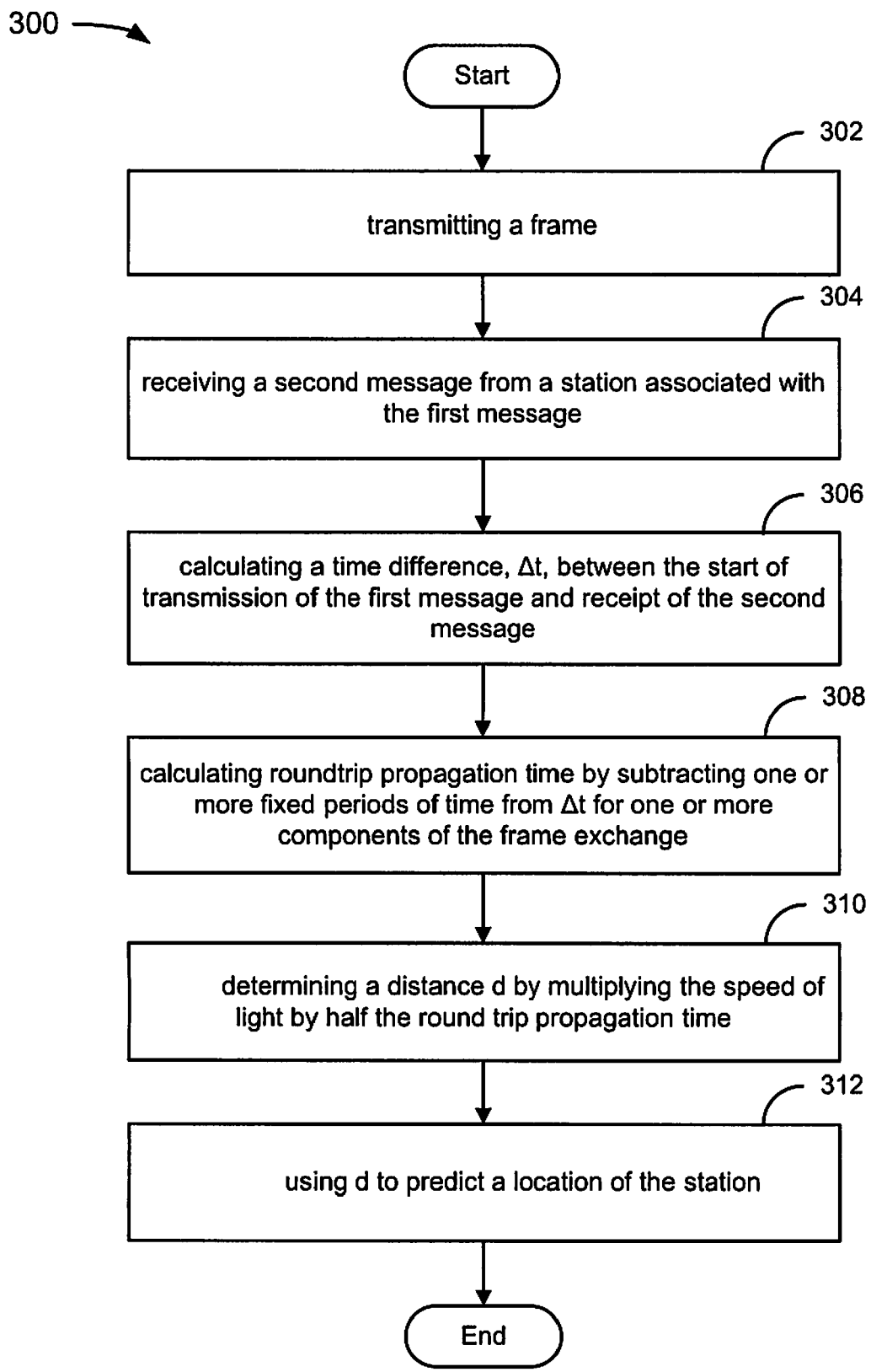
FIG. 3 depicts a flowchart of an example of a method of estimating a location of a station.

FIG. 3 depicts a flowchart 300 of an example of a method of estimating a location of a station. The method is organized as a sequence of modules in the flowchart 300. However, it should be understood that these and modules associated with other methods described herein may be reordered for parallel execution or into different sequences of modules.

In the example of FIG. 3, the flowchart 300 starts at module 302 with transmitting a frame. At the beginning of transmission, a time $t_0$ may be recorded indicating the beginning of transmission.

In the example of FIG. 3, the flowchart 300 continues to module 304 with receiving a second message from a station associated with the first message. Here, the acknowledgement frame is received at a time which is later than $t_0$. This time may be recorded as $t_1$.

In the example of FIG. 3, the flowchart 300 continues to module 306 with calculating a time difference, $\Delta t$, between the start of transmission of the first message and receipt of the second message. $t_0$ may be a time of beginning of transmission of the first message. $t_1$ may be a time of receipt of the second message. $\Delta t$ may be calculated by subtracting to from $t_1$: $\Delta t = t_0 - t_1$.

In the example of FIG. 3, the flowchart 300 continues to module 308 with calculating roundtrip propagation time by subtracting fixed periods of time from $\Delta t$ for components of the frame exchange. Fixed periods of time may include time to complete a physical layer convergence procedure (PLCP), a Media Access Control (MAC) Header, frame check sequence (FCS), short inter-frame space (SIFS), physical layer convergence procedure (PLCP), Media Access Control (MAC) Header, and frame check sequence (FCS). These fixed time periods are known so they may be stored. By subtracting fixed periods of time from $\Delta t$, the remaining time is equal to the amount of time that the transmitted frame, and the acknowledgement frame traveled between the station and the AP, or the round trip propagation time.

In the example of FIG. 3, the flowchart 300 continues to module 310 with determining a distance d by multiplying the speed of light by half the round trip propagation time. It is necessary to divide the round trip propagation time by two because the round trip includes traveling the distance between the AP and the station and then traveling between the station and the AP. The speed of light is used because the signals which transmit the frame travel at approximately the speed of light.

Figure 7:
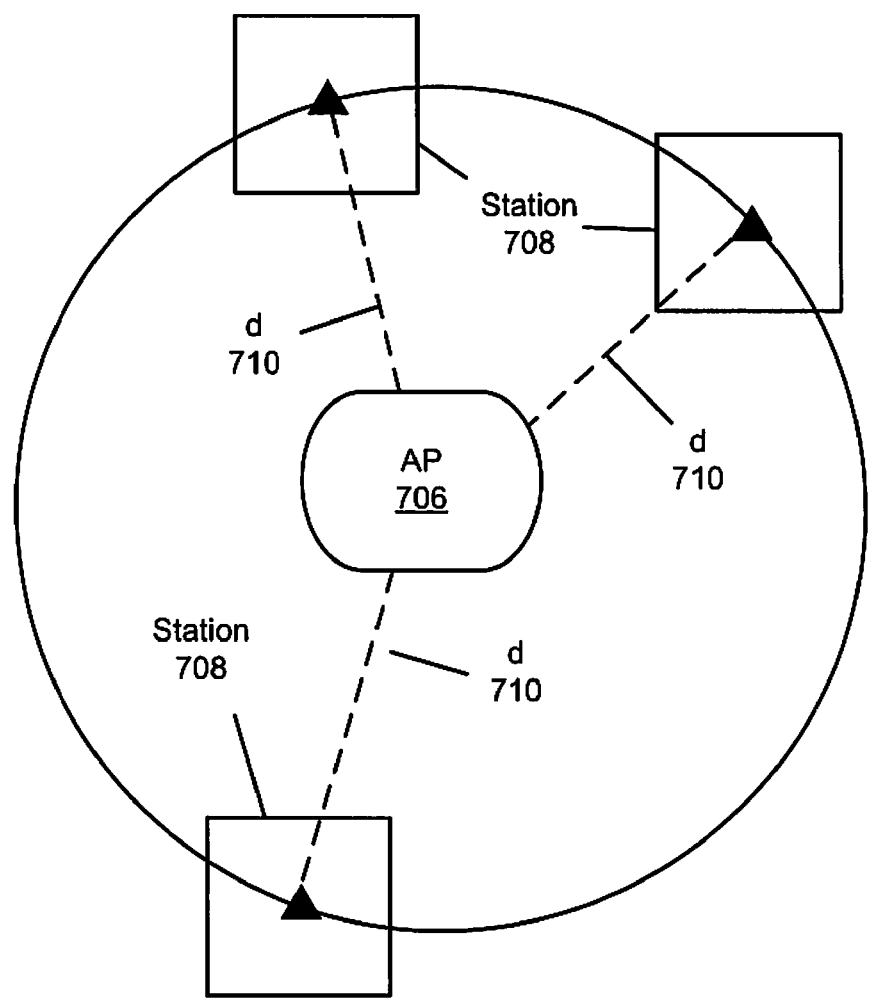
FIG. 7 depicts a diagram of an example of a plurality of possible locations for a station a distance d away from an access point.

In the example of FIG. 3, the flowchart 300 continues to module 312 with using d to estimate a location of the station. In two dimensions, knowing that the station is a distance d from the AP allows a location to be estimated in terms of points on a circle a distance d away from the AP, as depicted in FIG. 7. If more than one AP is used, the intersection of circles may be used to find possible locations of a station as discussed relative to FIG. 8-9. For estimation in three dimensions, refer to the discussions of FIG. 9 and FIG. 10. Having estimated the location of a station, the flowchart ends.

Figure 4:
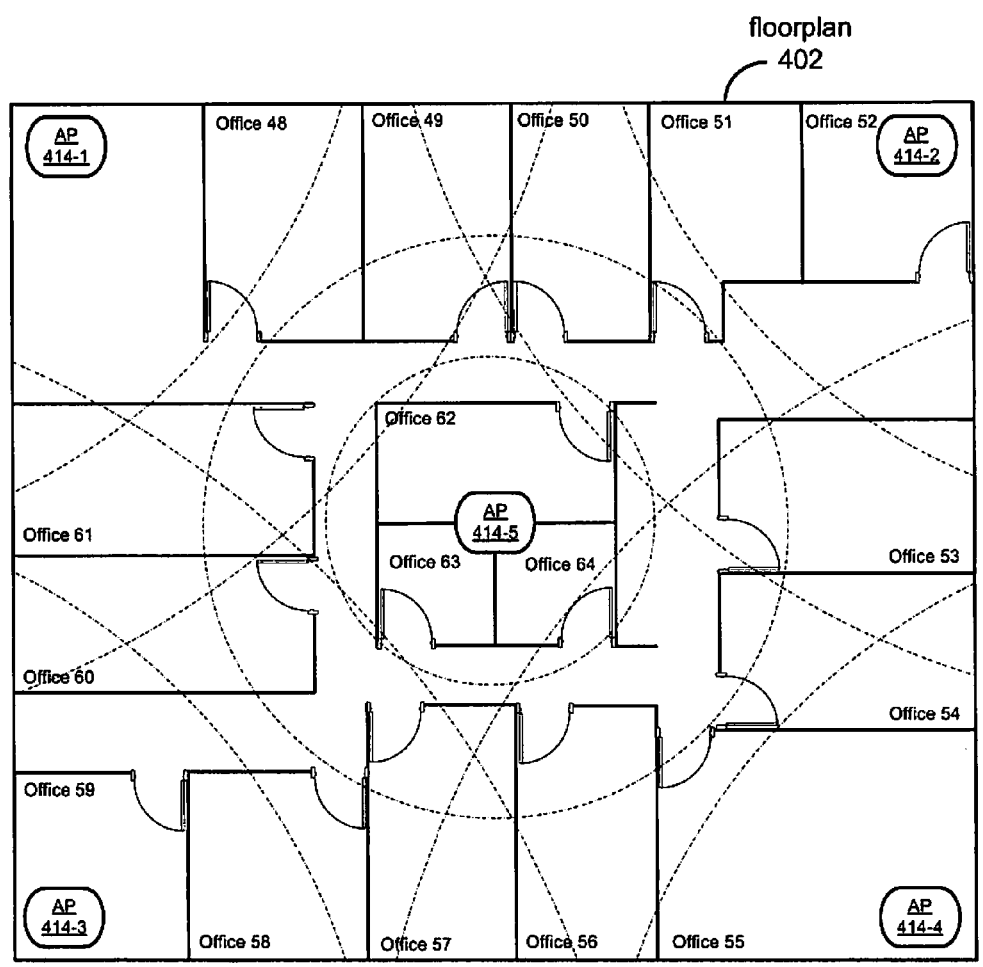
FIG. 4 depicts a diagram of an example of a floor plan including APs for a wireless access domain.

FIG. 4 depicts a diagram 400 of an example of a floor plan including APs for a wireless access domain. FIG. 4 includes floorplan 402, AP 414-1, AP 414-2, AP 414-3, AP 414-4 and AP 414-5 (Collectively, APs 414). In the example of FIG. 4, devices present in the offices depicted in floorplan 402 may connect to one or more of APs 414. APs 414 may be included as a part of a larger wireless access domain including wireless exchange switches and one or more network management modules. The APs may be coupled together via conventional network wiring.

In the example of FIG. 4, five APs may provide high quality service throughout all offices and hallways of the offices depicted in floorplan 402. Some APs may not be accessible from some locations on the floor plan. In a non-limiting example, AP 414-1 may not be accessible from office 54. Similarly parts of office 55 may receive no signal or only a weak signal from AP 414-5, and may receive no signal from AP 414-1. Weak signal strength or a low number of APs may negatively impact the ability of a network of APs to locate a station. For installations in which only a single AP provides a strong signal to an office, a distance to a station may be calculated. However, such a predicted distance to the station may indicate an infinite number of locations on a circle a distance d away from the AP.

The floor plan depicted in FIG. 4 could be a part of a network management module display in which the floor plan is depicted graphically, and clients, and rogues are graphically displayed by their estimated locations.

Figure 5:
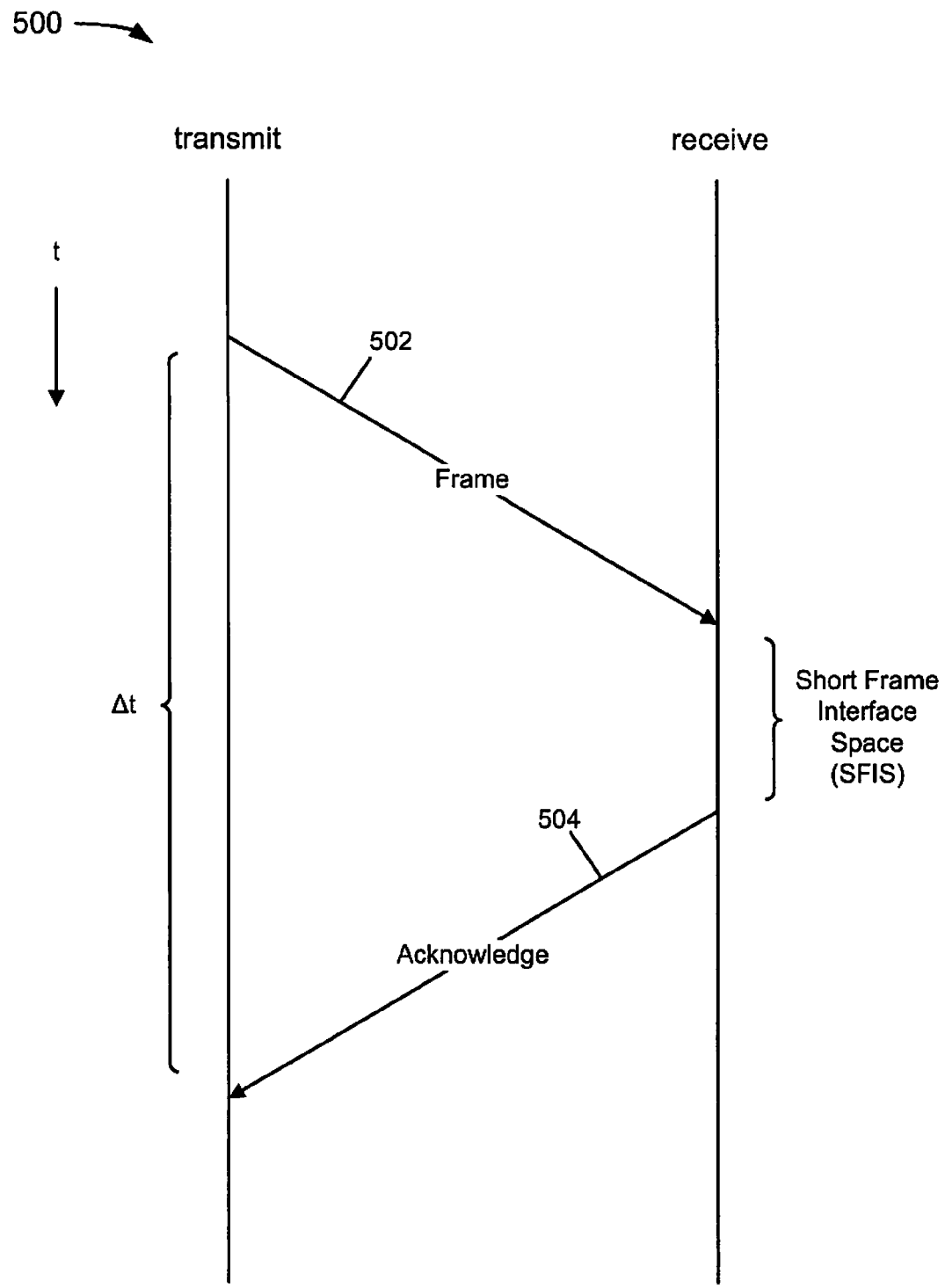
FIG. 5 depicts a diagram of an example of a sequence of transmitting a frame and receiving an acknowledgement frame.

FIG. 5 depicts a diagram 500 of an example of a sequence of transmitting a frame and receiving an acknowledgement frame. Diagram 500 includes frame transmission indicator 502, and acknowledge frame transmission indicator 504. A first ping frame is sent as shown by frame transmission indicator 502. Next acknowledgement frame transmission indicator 504 shows the transmission of an acknowledgement frame. Time spent between receipt of the transmitted frame but before sending an acknowledgement frame is referred to as a short frame interface space.

Figure 6:
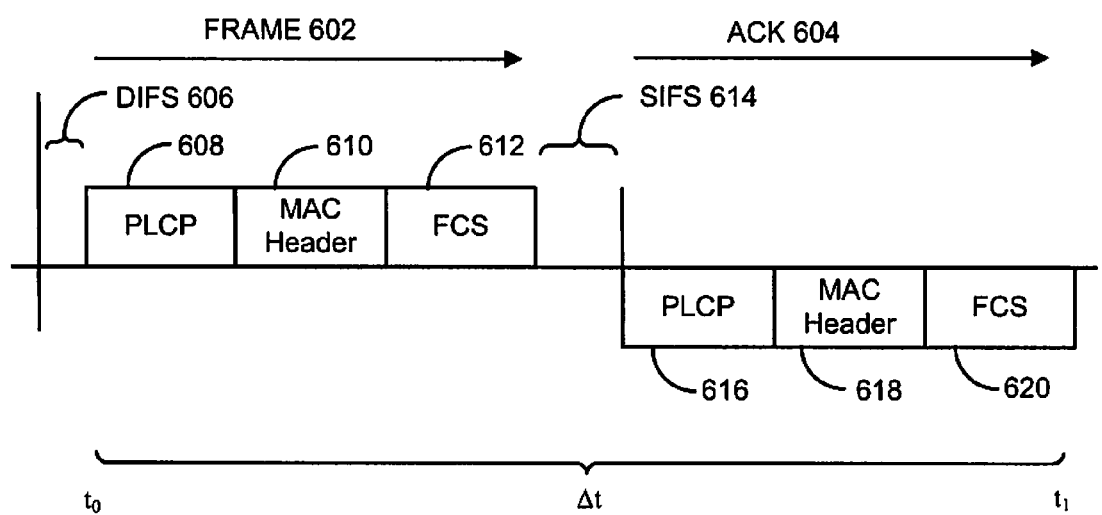
FIG. 6 depicts a diagram of fixed time components as a part of a sequence of transmitting a frame and receiving an acknowledgement frame.

FIG. 6 depicts a diagram 600 of fixed time components as a part of a sequence of transmitting a frame and receiving an acknowledgement frame. Diagram 600 includes frame transmission indicator 602, acknowledgement (ACK) frame transmission indicator 604, distributed inter-frame space (DIFS) 606, physical layer convergence procedure (PLCP) 608, Media Access Control (MAC) Header 610, frame check sequence (FCS) 612, short inter-frame space (SIFS) 612, physical layer convergence procedure (PLCP) 616, Media Access Control (MAC) Header 618, and frame check sequence (FCS) 620.

In subtracting time components for PLCP 608, MAC Header 610, FCS 612, PLCP 616, MAC Header 618, and FCS 620 from $\Delta t$, the remaining time may be attributed to the travel a round trip between the station and the AP. Half this time may be the amount of time for one frame to travel between the station and the AP.

FIG. 7 depicts a diagram 700 of an example of a plurality of possible locations for a station a distance d away from an access point. Diagram 700 includes access point 706, station 708, and distance (d) 710. This diagram assumes a two dimensional layout, such as a floorplan of an office. In such a case, the station will be a distance d away from the AP at a location that lies approximately on a circle or are around the station with a radius equal to the distance. In order to locate a device with more specificity, it may be necessary to use more than one AP. However, where a floor plan is such that the AP may only identify a limited range of locations, such as in a corner of a building, fewer points than necessary to comprise a whole circle may be used. In such a case, the possible locations will lie on an arc instead of a circle.

Figure 8:
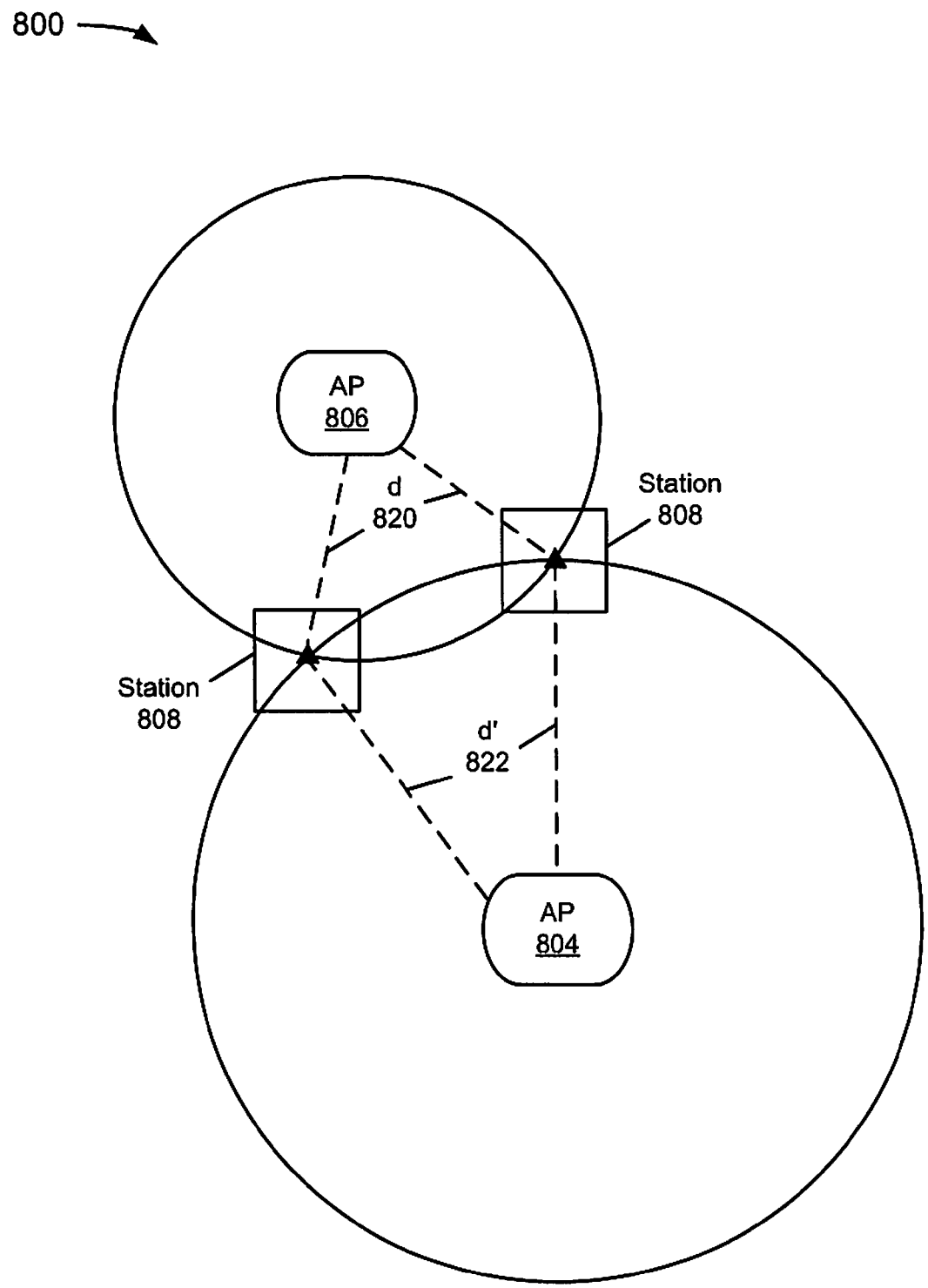
FIG. 8 depicts a diagram of an example of two possible locations for a station at points at which the station is a distance d away from the first station and a distance d" away from the second station.

FIG. 8 depicts a diagram 800 of an example of two possible locations for a station at points at which the station is a distance d away from the first station and a distance d" away from the second station. Diagram 800 includes access point (AP) 804, access point (AP) 806, station 808, distance (d) 820, and second distance (d') 822. Where two APs are used to reduce the number of potential locations for a station, there will be two distances d 820 and d' 822. The two distances d 820 and d' 822 will sweep circles around the APs. So long as the APs are not each at exactly the same location and have overlapping coverage areas, they will intersect at two points. Two possible locations are depicted.

Figure 9:
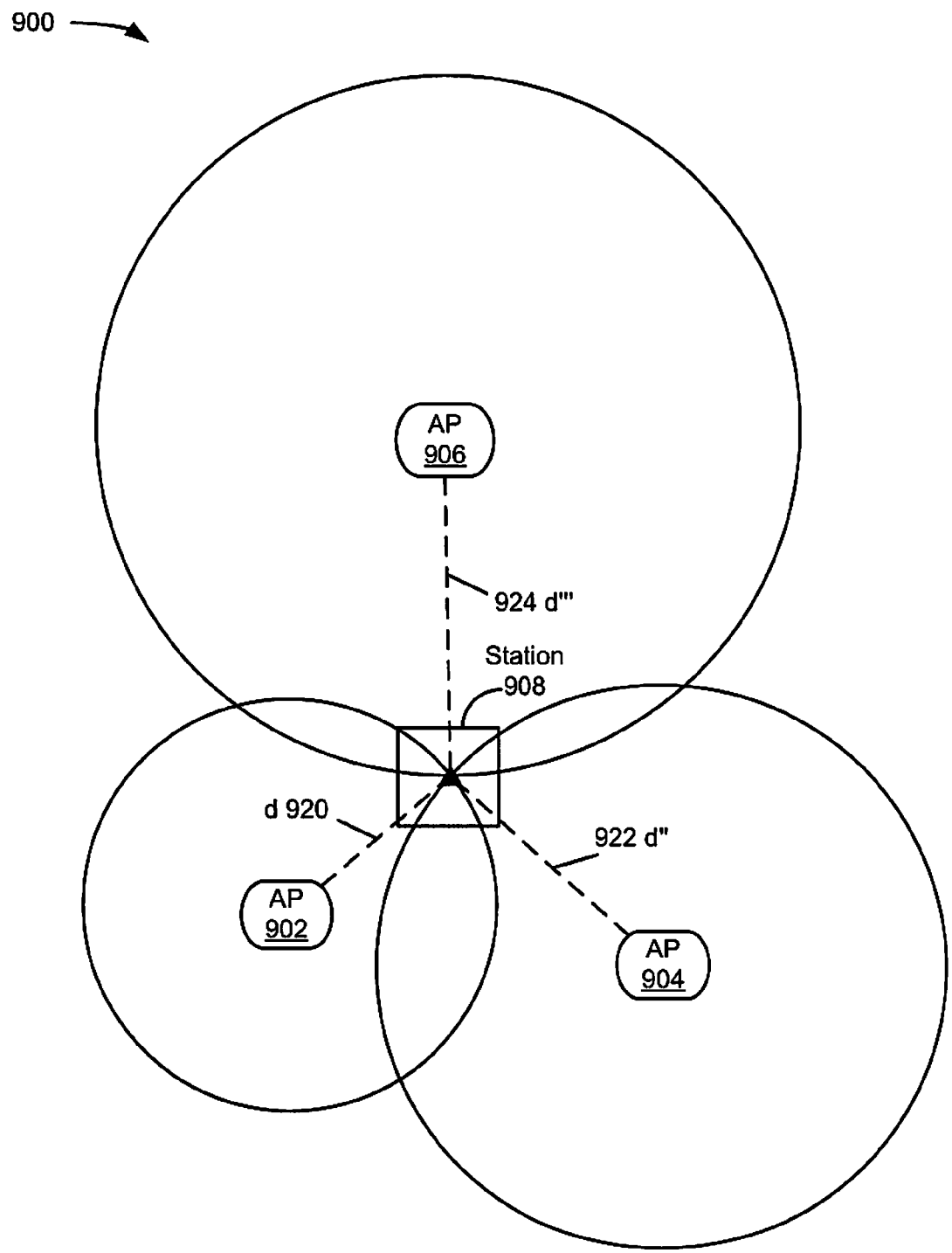
FIG. 9 depicts a diagram of an example of locating a device using three APs.

FIG. 9 depicts a diagram 900 of an example of locating a device using three APs. Diagram 900 includes Access Point (AP) 902, Access Point (AP) 904, Access Point (AP) 906, station 908, distance (d) 920, second distance (d') 922, and third distance (d''') 924. Similarly to FIG. 8, in a two dimensional system, three APs located at different locations may locate a station in exactly one point. AP 902, AP 904, and AP 906 each estimate distances d, d', and d'' respectively. d, d', and d'' sweep three circles around AP 902, AP 904, and AP 906.

Figure 10:
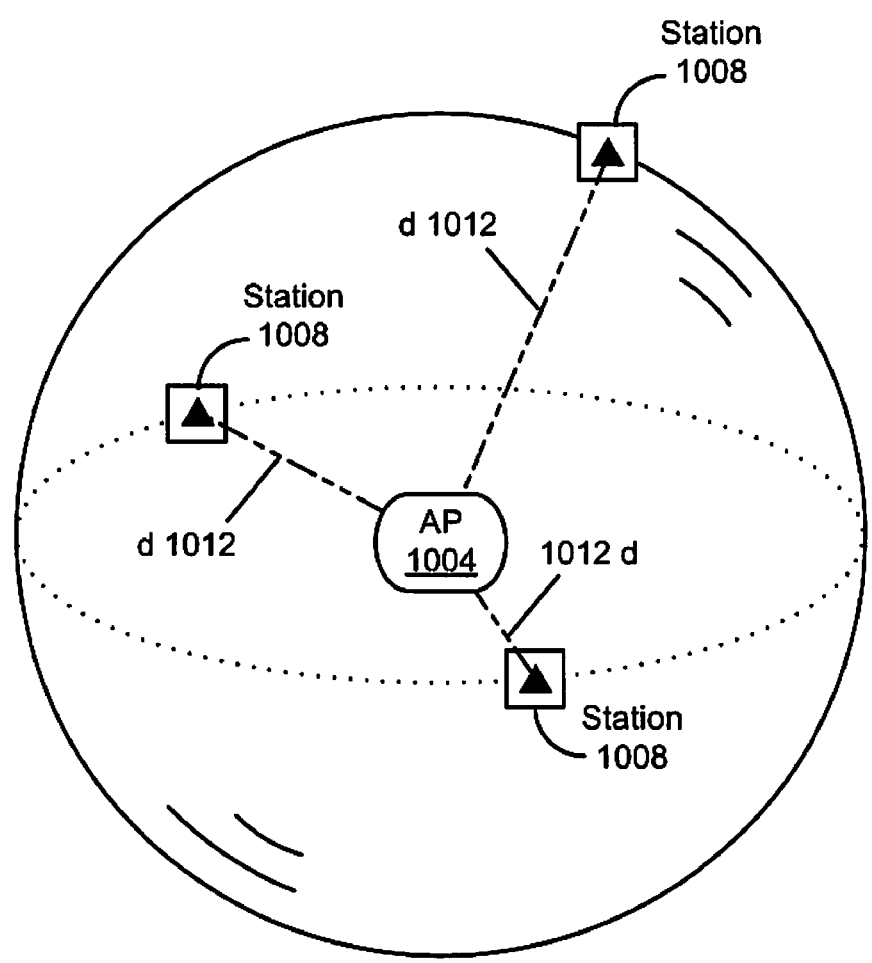
FIG. 10 depicts a diagram of an example of locating a device in three dimensional space using an AP.

FIG. 10 depicts a diagram 1000 of an example of locating a device in three dimensional space using an AP. The system 1000 includes AP 1004, station 1008, and distance (d) 1012. In this case, the AP is able to estimate a distance which can be used to sweep a sphere around the AP. Where AP 1004 is used, station 1008 can, without taking into account physical limitations, may be found at any point, a distance d away from the AP. The multiple locations displayed could be three of many different possible locations lying on the sphere surrounding the AP.

Figure 11:
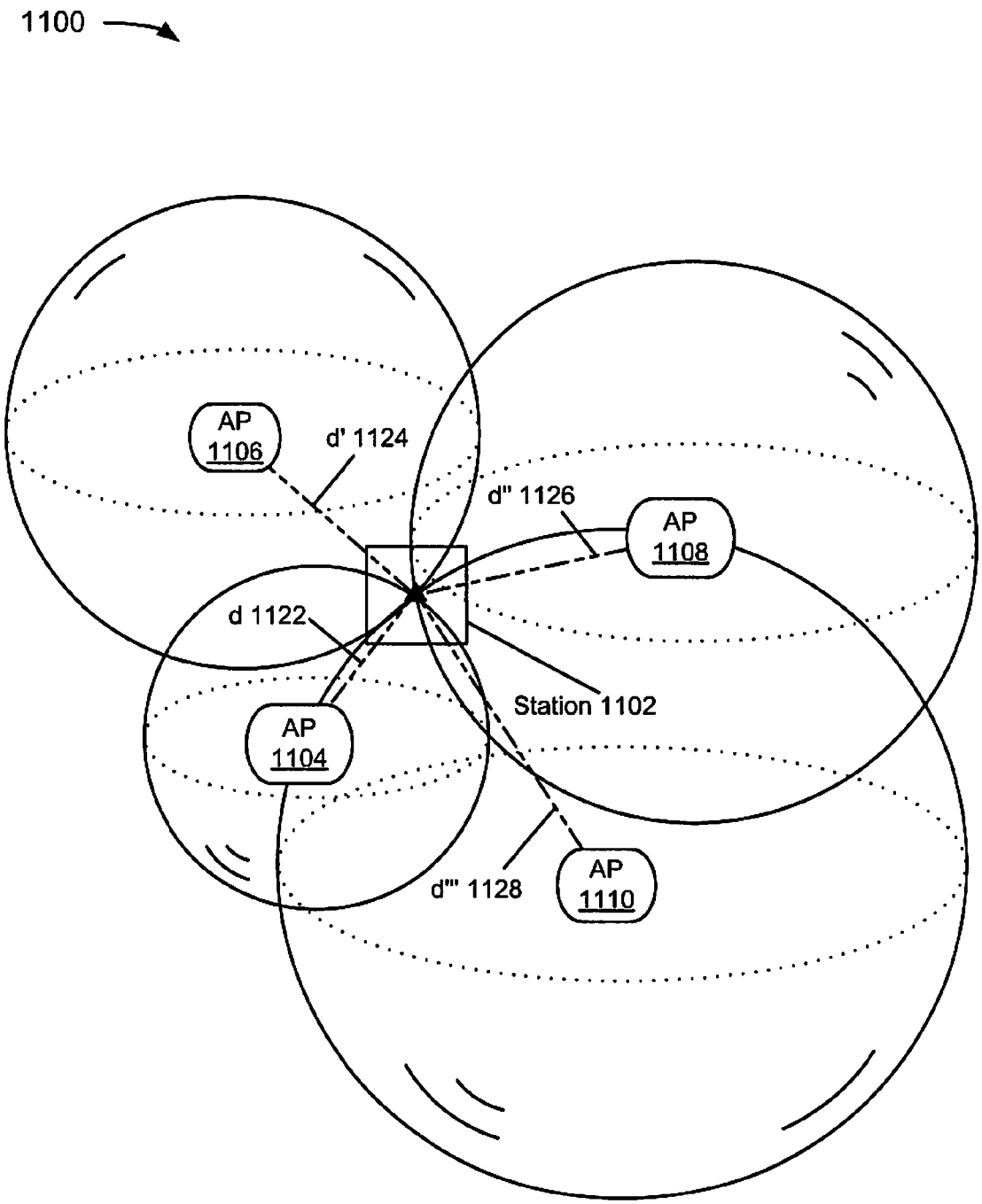
FIG. 11 depicts a diagram of an example of locating a device in three dimensional space using four APs.

FIG. 11 depicts a diagram 1100 of an example of locating a device in three dimensional space using four APs. The system 1100 includes station 1102, AP 1104, AP 1106, AP 1108, AP 1110, distance (d) 1124, second distance (d') 1124, third distance (d''') 1126, fourth distance (d''') 1128.

In three dimensions, it may be necessary to use four APs to identify a single location for station 1102. This is because the intersection between two spheres representing distances d and d' away from APs 1106 and 1108 may be a circle. A circle may intersect with the sphere representing the distance d" away from AP 1108 in two points. Finally, a sphere representing the distance d''' away from AP 1110 may intersect with a single one of the two points. This may identify a single point in three dimensions for a location of station 1102.

Figure 12:
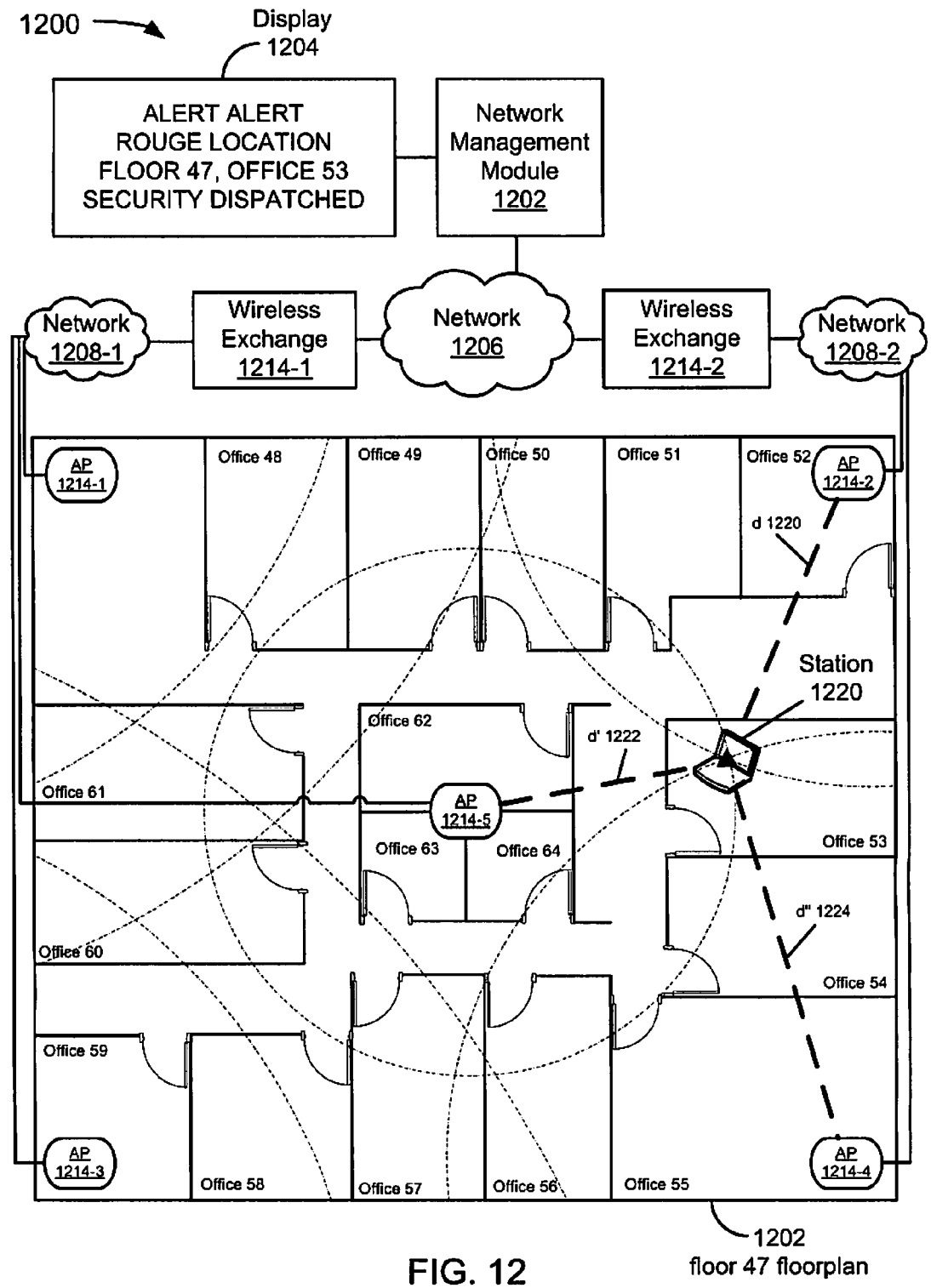
FIG. 12 depicts a diagram of an example of locating a rogue device on a floor plan using a wireless access domain.

FIG. 12 depicts a diagram of an example of locating a rogue device on a floor plan using a wireless access domain. The diagram 1200 includes network management module 1202, display 1204, rogue 1205, network 1206, and wireless access domain 1207. A floorplan is an exemplary two dimensional model in which to locate a station however, many other two dimensional or three dimensional models could be used; this model is for purposes of example and not limitation. Herein, AP 1214-2, AP 1214-4, and AP 1214-5 (Collectively APs 1214) have, as a group, identified the location of a rouge station a distance d away from AP 1214-2, a distance d' away from AP 1214-5, and a distance d" from AP 1214-4. Dashed circles and arcs represent distances away from access points.

In the example of FIG. 12, wireless access domain 1207 contains wireless access areas 108-1 through 108-N, (collectively wireless access areas 1208). Wireless exchange switches 1210-1 to 1210-N (hereinafter collectively referred to as wireless exchange switches 1210), access points 1212-1 to 1212-N (hereinafter collectively referred to as access points 1212), and networks 1214-1 to 1214-N (hereinafter collectively referred to as networks 1214).

In the example of FIG. 12, an operator of station 1220 has placed station 1220 in a hidden area, e.g. an air vent, and has opted to employ station 1220 for malicious purposes, e.g. theft of trade secrets from a system server. A system administrator here may be faced with the options of (1) terminating service on APs 1214, or alternatively (2) eliminating the rogue. Since the system administrator has been given the estimated location of the rogue, security may be dispatched, and the rogue eliminated. This prevents the interruption of service.

Display 1204 may display not only warning messages, such as "Alert," but also may display an entire floor plan animated with information about the location of rogues, clients, APs and other relevant information. Where the rogue is moving, the display may update the position of the rogue in real time.

Figure 13:
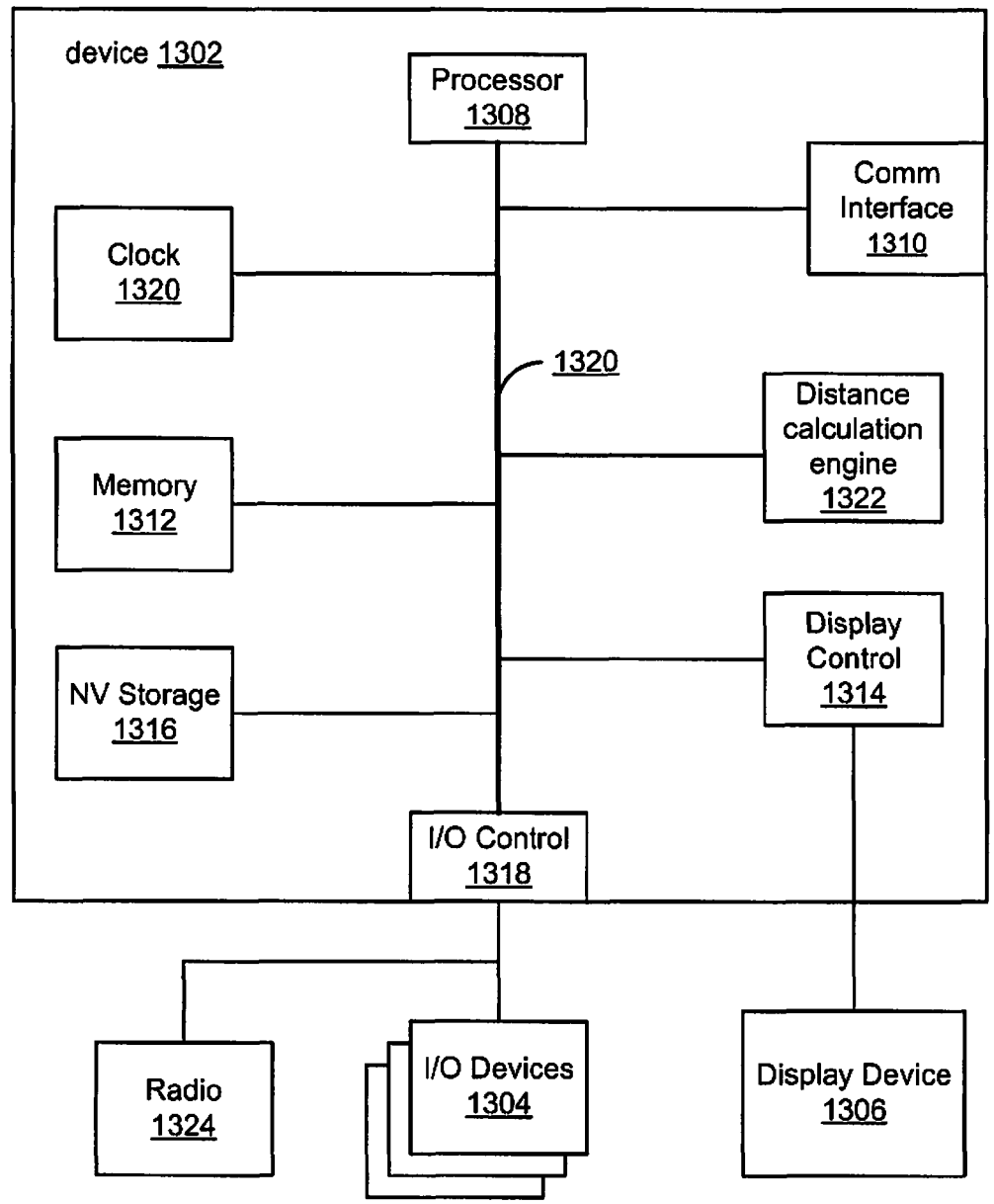
FIG. 13 depicts a diagram of a system capable of calculating a distance to another device.

FIG. 13 depicts a diagram 1300 of a system capable of calculating a distance to another device. The system 1300 may be a conventional computer system that can be used as a client computer system, such as a wireless client or a workstation, or a server computer system. The computer system 1300 includes a device 1302, I/O devices 1304, radio 1324, and a display device 1306. The device 1302 includes a processor 1308, a communications interface 1310, memory 1312, display controller 1314, non-volatile storage 1316, I/O controller 1318, clock 1320, and distance calculation engine 1322. The device 1302 may be coupled to or include the I/O devices 1304, display device 1306, and radio 1324.

The device 1302 interfaces to external systems through the communications interface 1310, which may include a modem or network interface. It will be appreciated that the communications interface 1310 can be considered to be part of the system 1300 or a part of the device 1302. The communications interface 1310 can be an analog modem, ISDN modem, cable modem, token ring interface, ethernet interface, wireless 802.11 interface, satellite transmission interface (e.g. "direct PC"), or other interfaces for coupling a computer system to other computer systems.

The processor 1308 may be, for example, a conventional microprocessor such as an Intel Pentium microprocessor or Motorola power PC microprocessor. The memory 1312 is coupled to the processor 1308 by a bus 1320. The memory 1312 can be Dynamic Random Access Memory (DRAM) and can also include Static RAM (SRAM). The bus 1320 couples the processor 1308 to the memory 1312, also to the non-volatile storage 1316, to the display controller 1314, and to the I/O controller 1318.

The I/O devices 1304 can include a keyboard, disk drives, printers, a scanner, and other input and output devices, including a mouse or other pointing device. The display controller 1314 may control in the conventional manner a display on the display device 1306, which can be, for example, a cathode ray tube (CRT) or liquid crystal display (LCD). The display controller 1314 and the I/O controller 1318 can be implemented with conventional well known technology.

The non-volatile storage 1316 is often a magnetic hard disk, an optical disk, or another form of storage for large amounts of data. Some of this data is often written, by a direct memory access process, into memory 1312 during execution of software in the device 1302. One of skill in the art will immediately recognize that the terms "machine-readable medium" or "computer-readable medium" includes any type of storage device that is accessible by the processor 1308 and is intended to encompass a carrier wave that encodes a data signal to the extent that such a carrier wave is patentable.

Clock 1320 can be any kind of oscillating circuit creating an electrical signal with a precise frequency. In a non-limiting example, clock 1320 could be a crystal oscillator using the mechanical resonance of vibrating crystal to generate the electrical signal.

Distance calculation engine 1322 includes functionality to estimate a distance between a first computing system and a second computing system.

Radio 1324 may be any combination of known or convenient electrical components including by way of example, but not limitation, transistors, capacitors, resistors, multiplexers, wiring, registers, diodes or any other electrical components known or convenient.

The system 1300 is one example of many possible computer systems which have different architectures. For example, personal computers based on an Intel microprocessor often have multiple buses, one of which can be an I/O bus for the peripherals and one that directly connects the processor 1308 and the memory 1312 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1312 for execution by the processor 1308. A Web TV system, which is known in the art, is also considered to be a computer system, but it may lack some of the features shown in FIG. 13, such as certain input or output devices. A typical computer system will usually include at least a processor, memory, and a bus coupling the memory to the processor.

In addition, the system 1300 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1316 and causes the processor 1308 to execute the various acts required by the operating system to input and output data and to store data in memory, including storing files on the non-volatile storage 1316.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present example is not described with reference to any particular programming language, and various examples may thus be implemented using a variety of programming languages.

What is claimed is:
1. A system, comprising:
   an access point (AP), wherein, in operation:
   the AP transmits a frame;
   stores a time of beginning of transmission, $t_0$;
   if an acknowledgement frame is received the AP stores a time of completion of receiving, $t_1$; and
   if the acknowledgement frame is not received after one or more frame transmissions, the AP denies future requests for access to a network from the station and sends an instruction to a network management module (NMM) to broadcast an address of the station to other APs in the network to allow the other APs to deny the station access; and
   the NMM, coupled to the AP, including:

memory having a value, $t_{fixed}$, stored therein, representing a known frame exchange component period of time, and a value, c, representing the speed of light;

a distance calculation engine, in operation, the distance calculation engine determining a distance, d, using a formula $d=[(t_1-t_0-t_{fixed})/2] \cdot c$, d representing an estimated distance of the AP from the station; and a graphical display engine, wherein, in operation, the graphical display engine displays one or more predicted locations the distance, d, from the AP in a graphically rendered environment.

2. The system of claim 1 wherein, in operation, the AP transmits a plurality of frames, receives a responding acknowledgement paired to each frame transmitted; and wherein, in operation, the distance calculating engine calculates a plurality of distance values for paired frames from the plurality of times for $t_0$ and $t_1$ and averages the plurality of distance values to find an estimated distance.

3. The system of claim 1 wherein the graphically rendered environment is two dimensional.

4. The system of claim 1 wherein the one or more predicted locations are displayed on a circle, a location of the AP being at a center of the circle, the circle having a radius of length d.

5. The system of claim 1 further comprising:
a second AP, wherein, in operation, the second AP transmits a second frame; stores a second time of beginning of transmission, $t_0'$; receives a second acknowledgement frame from the station; stores a second time of completion of receiving, $t_1'$;
wherein, in operation, the distance calculating engine calculates a second distance d' using a second formua $d'=[(t_1'-t_0'-t_{fixed})/2] \cdot c$ and d' is used to reduce the one or more predicted locations to two or fewer predicted locations; wherein the two or fewer predicted locations are displayed at intersecting points of two circles, a location of the AP being at a center of a first circle having a radius of length d, a second location of the second AP being at a second center of the second circle having a radius of length d'.

6. The system of claim 5 further comprising:
a third AP; wherein, in operation, the third AP transmits a third frame; stores a third time of beginning of transmission, $t_0'$; receives a third acknowledgement frame from the station; stores a third time of completion of receiving, $t_1'$ wherein, in operation, the distance calculating engine is used to calculate a third distance d" and the third distance d" is used to reduce the one or more predicted locations to one location; the one location is at a point a distance d from the AP, a distance d' from the second AP, and a distance d" from the third AP.

7. The system of claim 1 wherein the graphically rendered environment is rendered in three dimensions.

8. The system of claim 1 further comprising:
a second AP, wherein, in operation, the second AP transmits a second frame; stores a second time of beginning of transmission, $t_0'$; receives a second acknowledgement frame from the station; stores a second time of completion of receiving, $t_1'$;
a third AP a third AP; wherein, in operation, the third AP transmits a third frame; stores a third time of beginning of transmission, $t_0''$; receives a third acknowledgement frame from the station; stores a second time of completion of receiving, $t_1''$;
a fourth AP a fourth AP; wherein, in operation, the fourth AP transmits a fourth frame; stores a fourth time of beginning of transmission, $t_0'''$; receives a fourth acknowledgement frame from the station; stores a second time of completion of receiving, $t_1'''$;

wherein in operation, the second AP calculates a second distance $d'=[(t_1'-t_0'-t_{fixed})/2] \cdot c$, the third AP calculates a third distance $d''=[(t_1''-t_0''-t_{fixed})/2] \cdot c$, the fourth AP calculates a fourth distance $d'''=[(t_1'''-t_0'''-t_{fixed})/2] \cdot c$;

wherein the distance d, the second distance d', the third distance d", and the fourth distance d''' are used to identify a single point on the graphically rendered environment as a location of a station; the one location is at a point a distance d from the AP, a distance d' from the second AP, a distance d" from the third AP, and a distance d''' from the fourth AP.

9. The system of claim 1 wherein the frame is a null frame.

10. A method, comprising:
transmitting a first message from a first access point (AP);
if a second message, associated with the first message, is not received from the station, (1) disabling future access to a network by a station and (2) broadcasting an address of the station to a second AP in the network to allow the second AP to deny the station access; and
predicting a location of the station if the second message is received from the station, comprising:
calculating a time difference, $\Delta t$, between the start of transmission of the first message, $t_0$ and receipt of the second message, $t_1$, wherein $\Delta t=t_0-t_1$.
calculating roundtrip propagation time by subtracting one or more fixed periods of time from $\Delta t$ for one or more components of a frame exchange;
determining a distance d by multiplying the speed of light by half the round trip propagation time; and
predicting a location of the station based on d.

11. The method of claim 10 wherein the one or more fixed periods time subtracted from $\Delta t$ include times used to prepare the first message for transmission and to prepare the second message for transmission.

12. The method of claim 10 wherein the one or more components of the frame exchange comprise:
a transmission frame physical layer convergence procedure;
a transmission frame mac header;
a transmission frame check sequence;
a short inter-frame space;
an acknowledge frame physical layer convergence procedure;
an acknowledge frame mac header;
an acknowledge frame check sequence.

13. The method of claim 10 wherein the method is performed in numerous iterations and an estimated distance is found by averaging the distance d from each of the numerous iterations.

14. The method of claim 10 wherein the first message includes a header and a body, and the body is null.

15. A device, comprising:
a radio;
a propagation distance calculating engine;
wherein, in operation:
the radio sends a frame to a station,
the propagation distance calculating engine records a time of start of transmission of the frame,
when the radio does not receive an acknowledgement frame from the station, the device (1) denies future access to a network by the station through the device and (2) broadcasts an address of the station to other devices in the network to allow the other devices to deny access to the network by the station; and when the radio receives an acknowledgement frame from the station:
the propagation distance calculating engine stores a time of completion of receiving the acknowledgement frame, and
the propagation distance calculating engine calculates a distance by $d=[(\Delta t - t_{fixed})/2] \cdot c$, c being the speed of light, $\Delta t$ being the time of completion of receiving minus the time of start of transmission, and $t_{fixed}$ being a known frame exchange component period of time.

16. The device of claim 15 wherein, in operation, the radio sends a plurality of frames, the propagation distance calculating engine calculates a plurality of distance values, and the propagation distance calculating engine averages the distance values to calculate an estimate of the distance d.

17. The device of claim 15 wherein $t_{fixed}$ includes time components for a transmission frame physical layer convergence procedure, a transmission frame mac header, a transmission frame check sequence, a short inter-frame space, an acknowledgement frame physical layer convergence procedure, an acknowledge frame mac header, an acknowledge frame check sequence.

18. The device of claim 15 wherein the frame is a data null frame.

* * * * *